US011459025B2

(12) United States Patent
Fujita

(10) Patent No.: US 11,459,025 B2
(45) Date of Patent: Oct. 4, 2022

(54) DETECTION UNIT

(71) Applicant: DENSO CORPORATION, Kariya (JP)

(72) Inventor: Toshihiro Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 132 days.

(21) Appl. No.: 16/823,743

(22) Filed: Mar. 19, 2020

(65) Prior Publication Data
US 2020/0307682 A1 Oct. 1, 2020

(30) Foreign Application Priority Data

Mar. 28, 2019 (JP) .............................. JP2019-062388

(51) Int. Cl.
*B62D 5/04* (2006.01)
*G01M 17/06* (2006.01)
(52) U.S. Cl.
CPC ........... *B62D 5/0481* (2013.01); *G01M 17/06* (2013.01)
(58) Field of Classification Search
CPC .... B62D 5/0481; B62D 5/046; B62D 5/0484; B62D 5/049; B62D 15/0235; G01M 17/06; G01D 3/08; H02K 2211/03; H02K 11/02; H02K 11/215; H02K 11/27; H02K 11/30; H02K 11/33; G01L 5/221; G01L 25/003; H04Q 9/00
See application file for complete search history.

(56) References Cited

U.S. PATENT DOCUMENTS 6,791,219 B1 * 9/2004 Eric ..................... H02K 11/215
310/68 B
2003/0200018 A1 * 10/2003 Arimura .............. B62D 5/0457
180/443
(Continued)

FOREIGN PATENT DOCUMENTS

CN 102099997 A * 6/2011 ............. B62D 5/046
CN 102575946 A * 7/2012 ......... G01D 5/24476
(Continued)

OTHER PUBLICATIONS

"The Optimal Current Ratio Control of Redundant Electric Drive Systems and Diagnostic Strategies for Disagreement;" Youngwoo Noh, Wonkyu Kim, Ju Lee; IEEE Access (vol. 9, pp. 32115-32130); Jan. 1, 2021. (Year: 2021).*
(Continued)

*Primary Examiner* — Khoi H Tran
*Assistant Examiner* — Jorge O Peche
(74) *Attorney, Agent, or Firm* — Maschoff Brennan

(57) ABSTRACT

In a detection unit, a control unit includes an abnormality monitoring unit and a control calculation unit, and obtains an angle signal from different sensor units. The abnormality monitoring unit monitors abnormality of the angle signal. The control calculation unit performs calculation by using the angle signal. A second control unit obtains the angle signal by communication with a first control unit, i.e., from an other control unit. The abnormality monitoring unit, when comparing a subject system calculation value with an other system calculation value, uses a communication delay corrected value which has a correction of communication delay as at least one of the subject system calculation value and the other system calculation value.

11 Claims, 20 Drawing Sheets

(56) References Cited

U.S. PATENT DOCUMENTS

| | | | |
|---|---|---|---|
| 2014/0028294 A1* | 1/2014 | Granig | G01D 5/145 |
| | | | 324/207.21 |
| 2015/0239501 A1* | 8/2015 | Fujita | B62D 15/021 |
| | | | 701/41 |
| 2016/0231142 A1* | 8/2016 | Kawano | B62D 5/049 |
| 2017/0030742 A1 | 2/2017 | Mochizuki et al. | |
| 2017/0291640 A1* | 10/2017 | Fujita | G01D 18/00 |
| 2018/0216965 A1* | 8/2018 | Richard | G01D 5/2448 |
| 2019/0152524 A1* | 5/2019 | Fujita | G01D 5/14 |
| 2019/0157995 A1* | 5/2019 | Mori | H02K 11/215 |
| 2019/0184953 A1 | 6/2019 | Ishida et al. | |
| 2020/0207408 A1* | 7/2020 | Nakamura | B62D 15/021 |
| 2020/0307682 A1* | 10/2020 | Fujita | B62D 5/049 |
| 2020/0307683 A1* | 10/2020 | Fujita | H02P 6/16 |
| 2021/0148734 A1* | 5/2021 | Foletto | G01D 5/24485 |

FOREIGN PATENT DOCUMENTS

| | | | | |
|---|---|---|---|---|
| CN | 106063090 A | * | 10/2016 | B25J 13/088 |
| CN | 106945720 A | * | 7/2017 | B62D 5/0463 |
| CN | 107148741 A | * | 9/2017 | G01D 5/145 |
| CN | 107444481 A | * | 12/2017 | B62D 15/021 |
| CN | 108351197 A | * | 7/2018 | B62D 15/021 |
| CN | 109416259 A | * | 3/2019 | B62D 5/04 |
| CN | 109195859 B | * | 9/2021 | B62D 1/00 |
| DE | 102020104449 A1 | * | 9/2020 | B62D 5/0463 |
| EP | 3566929 A1 | * | 11/2019 | B62D 15/021 |
| JP | 2005186759 A | * | 7/2005 | B62D 5/0484 |
| JP | 2011002311 A | * | 1/2011 | G01D 5/145 |
| JP | 2013079027 A | * | 5/2013 | B62D 5/0481 |
| JP | 5339094 B2 | | 11/2013 | |
| JP | 2013253806 A | * | 12/2013 | G01D 5/24461 |
| JP | 5942613 B2 | * | 6/2016 | G01D 5/24461 |
| JP | 5958572 B2 | | 8/2016 | |
| JP | 6095845 B2 | | 3/2017 | |
| JP | 3210616 U | * | 6/2017 | |
| JP | 2017191093 A | | 10/2017 | |
| JP | 2018096782 A | * | 6/2018 | |
| JP | 2018197737 A | * | 12/2018 | |
| JP | 2019082358 A | * | 5/2019 | |
| WO | WO-0120600 A1 | * | 3/2001 | B62D 5/046 |
| WO | WO-2017175843 A1 | * | 10/2017 | B62D 15/0215 |

OTHER PUBLICATIONS

"Sensors of rotor phase currents and load determination unit of asynchronous drive of harmonic rotation;" Tergemes Kazhybek Tleugaliuly; 2016 13th International Scientific-Technical Conference on Actual Problems of Electronics Instrument Engineering (APEIE) (vol. 03, pp. 69-72); Oct. 1, 2016. (Year: 2016).*

* cited by examiner

FIG. 14

| RETRY # | SYSTEM L1 | | | SYSTEM L2 | | |
|---|---|---|---|---|---|---|
| | PAIRED | | ABN HIST REC FOR COMP RESULT NORMAL TIME | PAIRED | | ABN HIST REC FOR COMP RESULT NORMAL TIME |
| | FOR OUTPUT | FOR ABN MON | | FOR OUTPUT | FOR ABN MON | |
| 0 | DA1 | DB1 | — | DA2 | DB2 | — |
| 1 | DA1 | DA2 | ABN OF DB1 | DA2 | DA1 | ABN OF DB2 |
| 2 | DA1 | DB2 | ABN OF DB1, DA2 | DA2 | DB1 | ABN OF DB2, DA1 |
| 3 | DB1 | DA2 | ABN OF DA1 | DB2 | DA1 | ABN OF DA2 |
| 4 | DB1 | DB2 | ABN OF DA1, DA2 | DB2 | DB1 | ABN OF DA2, DA1 |
| 5 | DA2 | DB2 | ABN OF DA1, DB1 | DA1 | DB1 | ABN OF DA2, DB2 |

| STG AREA | ANG SIG | CORR VAL |
|---|---|---|
| 0 | DA2_mr0 | Δθ_mr0 |
| 1 | DA2_mr1 | Δθ_mr1 |
| 2 | DA2_mr2 | Δθ_mr2 |
| 3 | DA2_mr3 | Δθ_mr3 |
| ⋮ | ⋮ | ⋮ |
| 255 | DA2_mr255 | Δθ_mr255 |

DETECTION UNIT

CROSS REFERENCE TO RELATED APPLICATION

The present application is based on and claims the benefit of priority of Japanese Patent Application No. 2019-062388, filed on Mar. 28, 2019, the disclosure of which is incorporated herein by reference.

TECHNICAL FIELD

The present disclosure generally relates to a detection unit.

BACKGROUND INFORMATION

In the related art, a motor rotation angle detection device that detects a rotation angle of a motor is known. For example, two sensor units may be provided, and the calculation function of the rotation angle is made redundant, and the operation of an electric power steering apparatus is continuable even when abnormality occurs in either one of the two sensor units.

In the related art, an abnormal part is identified by using an output signal of the other system, in view of a subject system, obtained by communication between microcomputers (i.e., via an inter-computer communication). When obtaining signals from the other system via an inter-computer communication, a communication delay may have influence on, for example, a detection timing of the signals obtained from the other system.

SUMMARY

It is an object of the present disclosure to provide a detection unit capable of appropriately detecting an abnormality using a value shared by communication.

BRIEF DESCRIPTION OF THE DRAWINGS

Objects, features, and advantages of the present disclosure will become more apparent from the following detailed description made with reference to the accompanying drawings, in which:

FIG. 14 is an illustration diagram of a retry table according to a sixth embodiment;

DETAILED DESCRIPTION

First Embodiment

Figure 1:
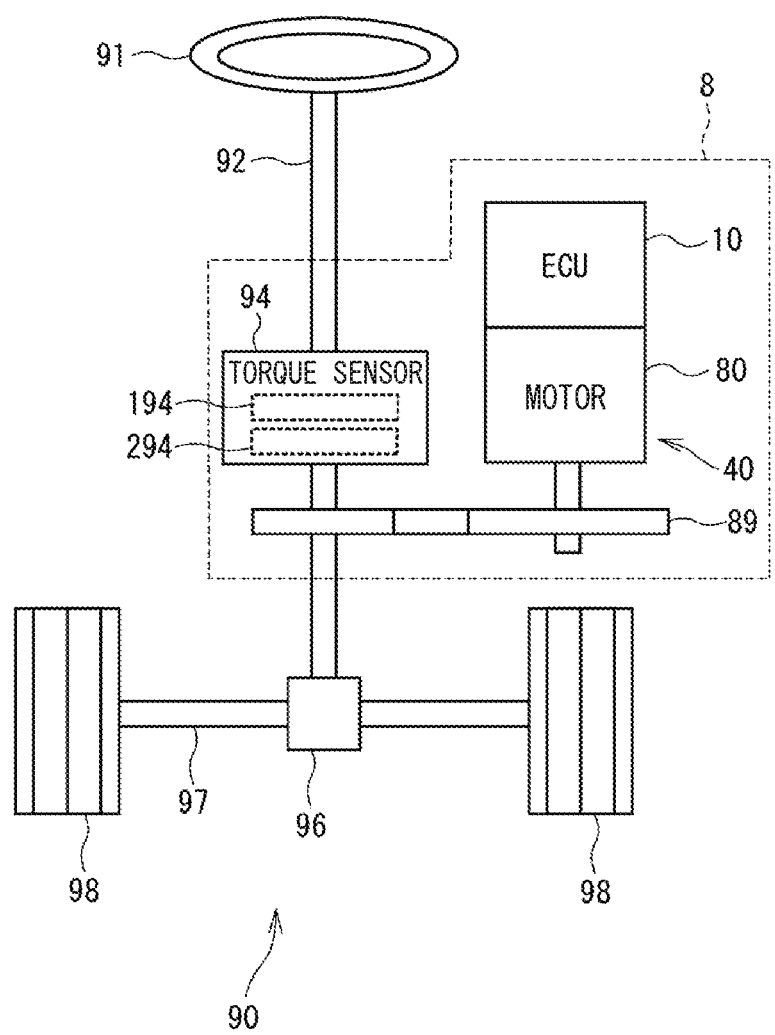
FIG. 1 is a schematic diagram of a steering system according to a first embodiment.

A detection unit and an electric power steering apparatus using the same according to the first embodiment are shown in FIGS. 1 to 8. As shown in FIG. 1, an ECU 10 as a detection unit is applied to an electric power steering apparatus 8 for assisting a steering operation of a vehicle together with a motor 80 which is a rotating electric machine. FIG. 1 shows an overall configuration of a steering system 90 including the electric power steering apparatus 8. The steering system 90 includes a steering wheel 91 (i.e., a steering member), a steering shaft 92, a pinion gear 96, a rack shaft 97, road wheels 98, the electric power steering apparatus 8 and the like.

The steering wheel 91 is connected to the steering shaft 92. A torque sensor 94 is provided on the steering shaft 92 to detect a steering torque. The torque sensor 94 includes a first torque detection unit 194 and a second torque detection unit 294. The pinion gear 96 is provided at an axial end of the steering shaft 92. The pinion gear 96 engages with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to the displacement amount of the rack shaft 97.

The electric power steering apparatus 8 includes a drive device 40, which includes the motor 80 and the ECU 10, and a speed-reduction gear 89 or the like as a power transmission mechanism that reduces the rotation speed of the motor 80 and transmits the rotation to the steering shaft 92. The electric power steering apparatus 8 of the present embodiment is a column assist type, but it may also be a rack assist type that transmits the rotation of the motor 80 to the rack shaft 97. In the present embodiment, the steering shaft 92 corresponds to a driven object.

Figure 2:
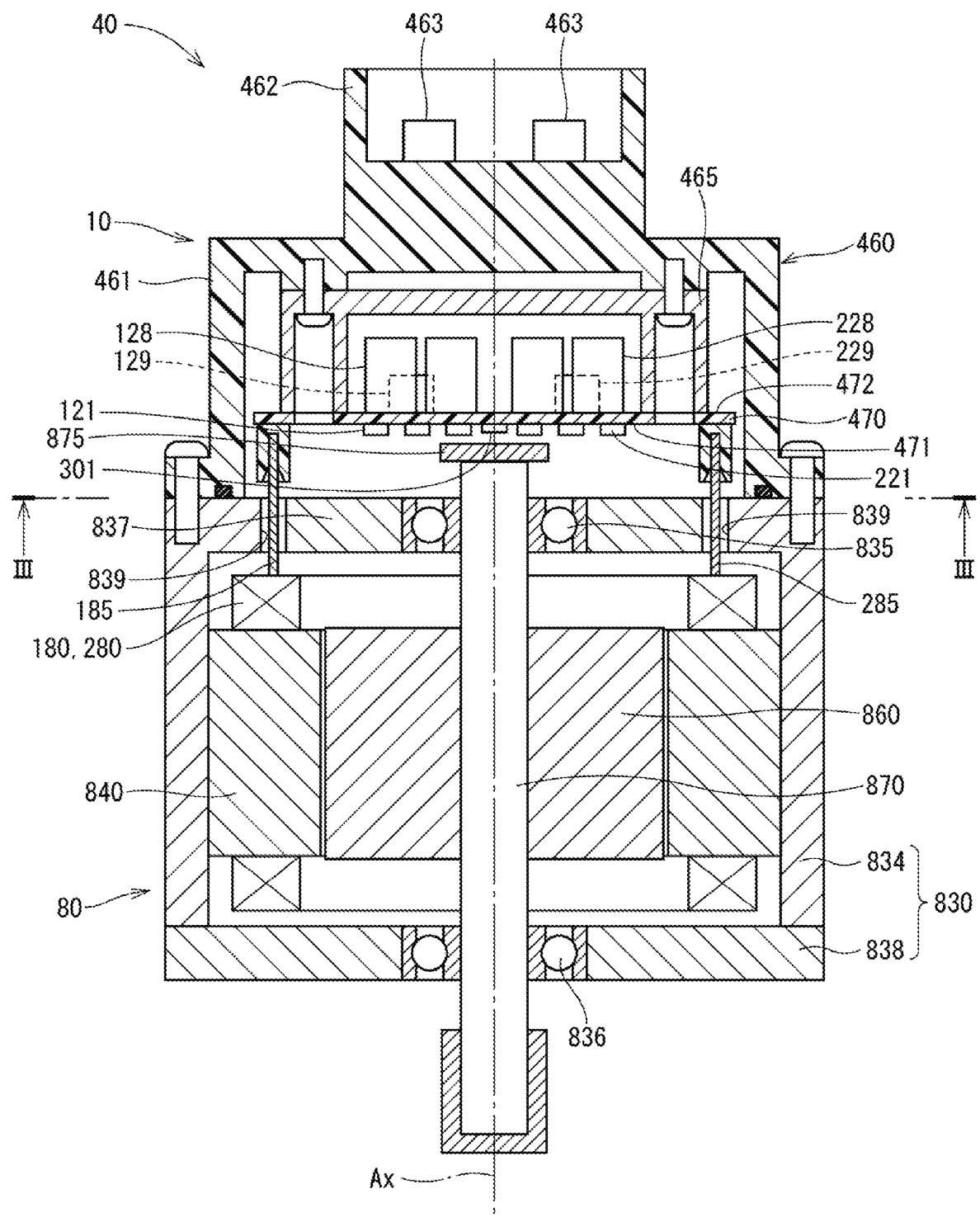
FIG. 2 is a cross-sectional view of a drive device according to the first embodiment.
Figure 3:
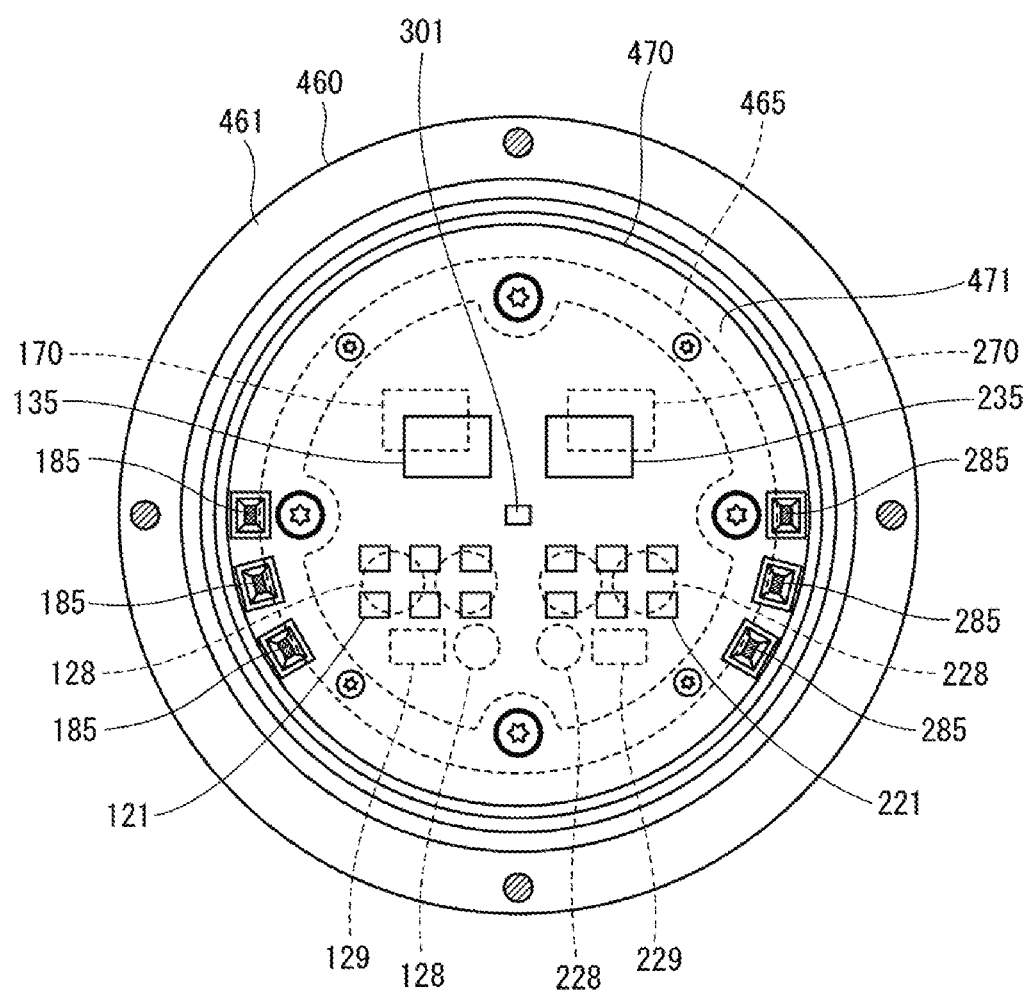
FIG. 3 is a cross-sectional view taken along a line III-III in FIG. 2.

As shown in FIGS. 2 and 3, the motor 80 outputs part or all of the torque required for steering operation, and is driven by the supply of electric power from a battery (not shown)

to drive the speed-reduction gear 89 in a forward and backward rotation. The motor 80 is a three-phase brushless motor, and has a rotor 860 and a stator 840 as shown in FIG. 2.

The motor 80 has a first motor winding 180 and a second motor winding 280 respectively as a winding set. The motor windings 180 and 280 have the same electrical characteristics, and are cancel-wound around the common stator 840 at a shift of an electrical angle of 30 [deg] from each other. Correspondingly, phase currents are controllably supplied to the motor windings 180 and 280 such that the phase currents have a phase difference φ of 30 degrees. By optimizing a current supply phase difference, the output torque is improved. It may also reduce a sixth-order torque ripple. Further, since the electric current is averaged among the motor windings by the power supply with such phase difference, benefits of cancellation of noise and vibration are maximized. Further, heat generation is also averaged among the motor windings (i.e., among two systems of motor winding and other components), thereby suppliable amounts of electric current among the two systems are averaged, together with a reduction of temperature-dependent intersystem errors in detection values of each sensor, torque and the like. Note that the electrical characteristics of the motor windings 180 and 280 may be different from each other.

Hereinafter, the configuration of a first drive circuit 120 and the like related to a drive control of the first motor winding 180 will be referred to as a first system L1, and the configuration of the second drive circuit 220 and the like related to a drive control of the second motor winding 280 will be referred to as a second system L2. Further, the configuration related to the first system L1 is basically assigned with 100 numbers, and the configuration related to the second system L2 is basically assigned with 200 numbers. That is, in the first system L1 and the second system L2, same or similar configuration has the same numbers in the least significant two digits. Further, when appropriate, the term "first" is indicated by a suffix "1," and the term "second" is indicated by a suffix "2."

In the drive device 40, the ECU 10 is integrally provided on one axial end of the motor 80, which may bear a name of mecha-ele integrated type drive device. However, the drive device may have the motor 80 and the ECU 10 separately disposed from each other. The ECU 10 is disposed coaxially with an axis Ax of a shaft 870 on one side opposite to the output shaft of the motor 80. The ECU 10 may alternatively be disposed on an output shaft side of the motor 80. By adopting the mecha-ele integrated type configuration, an efficient arrangement of the ECU 10 and the motor 80 in a restricted installation space of the vehicle is realized.

The motor 80 includes the stator 840, the rotor 860 together with a housing 830 which houses the stator 840 and the rotor 860 therein and the like. The stator 840 is fixed to the housing 830 and the motor windings 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. An end portion of the shaft 870 on the ECU 10 side protrudes from the housing 830 toward the ECU 10. A magnet 875 is provided at an axial end of the shaft 870 on the ECU 10 side. The center of the magnet 875 is disposed on the axis Ax.

The housing 830 includes a bottomed cylindrical case 834, which has a rear frame end 837, and a front frame end 838 provided on an open side of the case 834. The case 834 and the front frame end 838 are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. The lead wires 185 and 285 are taken out from the lead wire insertion holes 839 toward the ECU 10, and are connected to a circuit board 470.

The ECU 10 includes a cover 460, a heat sink 465 fixed to the cover 460, the circuit board 470 fixed to the heat sink 465, other electronic components mounted on the circuit board 470, and the like.

The cover 460 is provided to protect the electronic components from external impacts and to prevent dust and water from entering into an inside of the ECU 10. In the cover 460, a cover main body 461 and a connector member 462 are integrally formed. Note that the connector member 462 may alternatively be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at an end portion in the axial direction of the drive device 40, and is open on one side opposite to the motor 80.

The circuit board 470 is, for example, a printed circuit board, and is positioned to face the rear frame end 837. On the circuit board 470, electronic components for two systems are mounted in two separate regions for each system. Note that, though electronic components shared between the two systems are mounted (i.e., gathered) on a single circuit board 470 in the present embodiment, such electronic components may also be mounted on (i.e., distributed among) a plurality of circuit boards.

Of two principal surfaces of the circuit board 470, one surface on the side of the motor 80 is referred to as a motor-side surface 471 and the other surface opposite to the motor 80 is referred to as a cover-side surface 472. As shown in FIG. 3, switching elements 121 configuring the drive circuit 120 and switching elements 221 configuring the drive circuit 220 are mounted on the motor-side surface 471, together with the rotation angle sensors 126, 226, custom ICs 159, 259 and the like. The angle sensors 126 and 226 are respectively mounted at positions facing the magnet 875 to be capable of detecting a change in the magnetic field caused by the rotation of the magnet 875.

On the cover-side surface 472, capacitors 128, 228, inductors 129, 229, and microcomputers implementing control units 170, 270 are mounted. In FIG. 3, numbers "170" and "270" are assigned to the microcomputers provided as the control units 170 and 270, respectively. The capacitors 128 and 228 smoothen input electric power. The capacitors 128 and 228 assist supply of electric power to the motor 80 by storing electric charge therein. The capacitors 128, 228 and the inductors 129, 229 are configured as filter circuits, respectively, to reduce noises transmitted from other devices which share the battery, and also to reduce noises transmitted to the other devices, which share the battery, from the drive device 40. Although not shown in FIG. 3, power supply relays 122 and 222, motor relays 125 and 225, current sensors 127 and 227, and the like are also mounted on the motor-side surface 471 or the cover-side surface 472.

Figure 4:
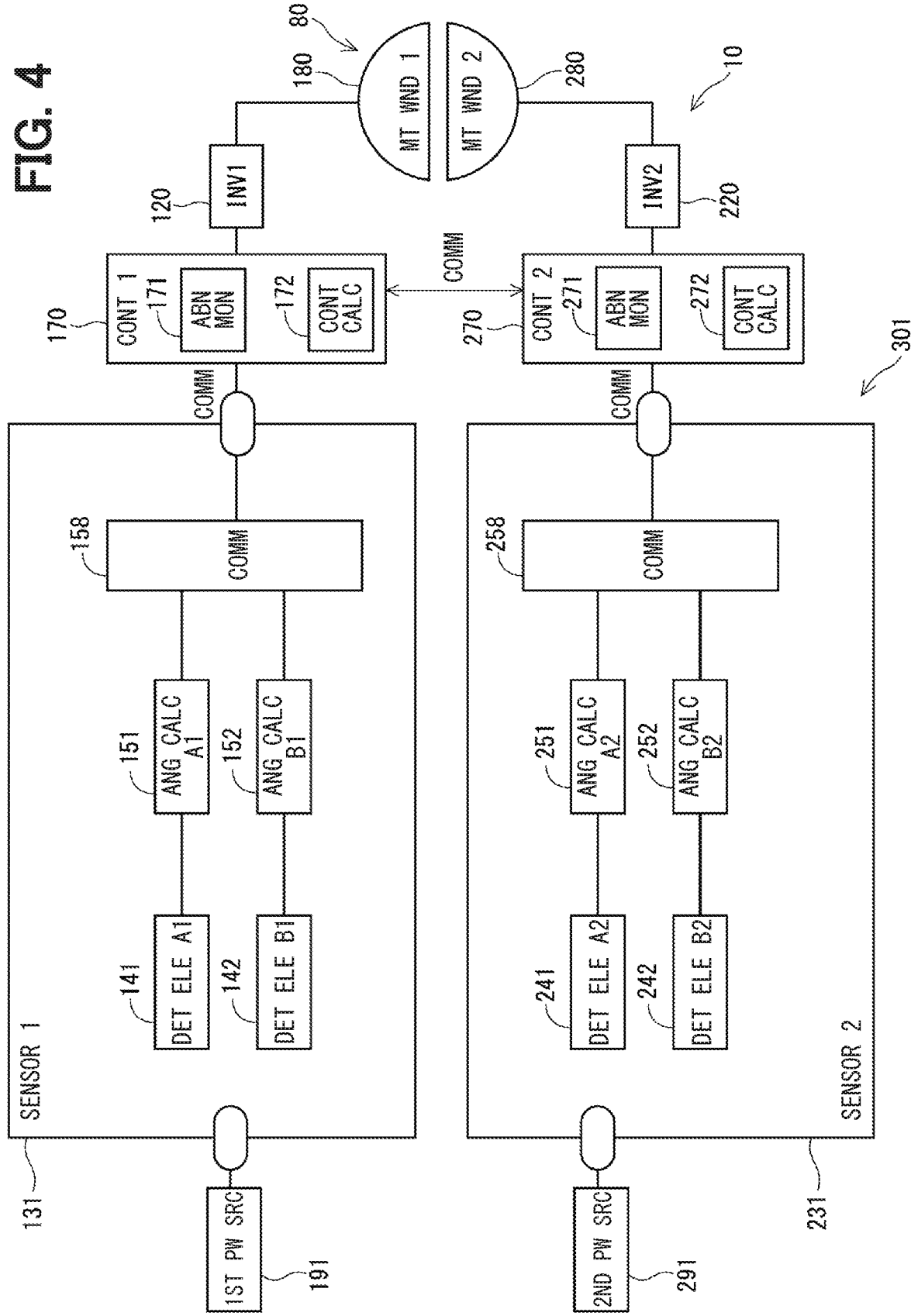
FIG. 4 is a block diagram of an electronic control unit (ECU) according to the first embodiment.

As shown in FIG. 4, the ECU 10 includes the drive circuits 120 and 220, the control units 170 and 270, a rotation angle sensor 301, and the like. In FIG. 4, the driver circuit, which is generally an inverter, is described as "INV." The first drive circuit 120 is a three-phase inverter having six switching elements 121, and converts the electric power supplied to the first motor winding 180. The second driver circuit 220 is a three-phase inverter having six switching elements 221, and converts the electric power supplied to the second motor winding 280. The ON/OFF operation of the switching element 121 is controlled based on a control signal output from the first control unit 170, and the ON/OFF operation of the switching element 221 is controlled based on a control signal output from the second control unit 270.

The rotation angle sensor 301 includes a first sensor unit 131 and a second sensor unit 231. The first sensor unit 131 outputs a detection value to the first control unit 170, and the second sensor unit 231 outputs a detection value to the second control unit 270. The sensor units 131 and 231 may be separately packaged or may be provided in one package. Since the sensor units 131 and 231 have the same configuration, the first sensor unit 131 will be mainly described, and the description of the second sensor unit 231 will be omitted as appropriate. The same applies to the eighth embodiment.

The first sensor unit 131 includes a main detection element 141, a sub detection element 142, angle calculation units 151 and 152, and a communication unit 158, and electric power is supplied thereto from a first power source 191. The first power source 191 is an ignition power source or a regulator power source. The first power source 191 and a second power source 291 described later may be connected to a common battery, or the power supplies 191 and 291 may be connected separately to different batteries.

The detection elements 141 and 142 detect changes in the magnetic field of the magnet 875 according to the rotation of the motor 80, and respectively are, for example, a magneto-resistive element or a Hall element such as an AMR sensor, a TMR sensor, a GMR sensor, and the like. The detection elements 141 and 142 desirably have respectively different sensing characteristics. For example, the main detection element 141 is an AMR element, and the sub detection element 142 is a TMR element. Here, even if the types of elements are the same among the elements 141 and 142, differences in layout and proportion of materials, manufacturing lots and wafer numbers in lots, and chip positions in the wafers may also be regarded as "the configuration related to the element is different." Further, when not only the element itself but also the detection circuit connected to the element and the type of the power source are different, it may be regarded as "the configuration related to the element is different." By using sensor elements having respectively different sensor characteristics, for example, a detection unit is less susceptible to a failure by a common cause (i.e., may also be mentioned hereafter as "common cause failure") such as a magnetic flux density abnormality commonly affecting two or more sensor elements, which is preferable from the viewpoint of functional safety. Hereinafter, as appropriate, the configuration and values directly from or related to the main detection element 141 have a suffix "A1," and the configuration and values directly from or related to the sub detection element 142 have a suffix "B1."

Here, the detection elements 141 and 142 are denoted as "main" and "sub" in order to distinguish the two elements. In the present embodiment, the main detection element 141 is used for control, and the sub detection element 142 is used for abnormality monitoring. However, they may be functionally equivalent. The same applies to the detection elements 241 and 242.

The angle calculation unit 151 calculates an angle signal DA1 based on the detection value of the main detection element 141 that has been AD converted by an AD conversion unit (not shown). The angle calculation unit 152 calculates an angle signal DB1 based on the detection value of the sub detection element 142 that has been AD converted by an AD conversion unit (not shown). The angle signals DA1 and DB1 are values corresponding to the rotation angle of the rotor 860, and may be any value that can be converted to the rotation angle.

The communication unit 158 generates an output signal including the angle signals DA1 and DB1 and outputs the output signal to the first control unit 170 by digital communication such as SPI communication. The communication method may be a method other than SPI communication. Alternatively, the angle signals DA1 and DB1 may be output separately to the first control unit 170.

The second sensor unit 231 includes a main detection element 241, a sub detection element 242, angle calculation units 251 and 252, and a communication unit 258, and electric power is supplied thereto from a second power source 291. The types of the detection elements 241 and 242 are different from each other, and, the configuration and values directly from or related to the main detection element 241 have a suffix "A2," and the configuration and values directly from or related to the sub detection element 242 have a suffix "B2."

The angle calculation unit 251 calculates an angle signal DA2 based on the detection value of the main detection element 241 that has been AD converted, and the angle calculation unit 252 calculates an angle signal DB2 based on the detection value of the sub detection element 242 that has been AD converted. The communication unit 258 outputs the angle signals DA2 and DB2 to the second control unit 270.

A main part of each of the control units 170 and 270 is configured by a microcomputer or the like, and both units 170 and 270 include a CPU, a ROM, a RAM, an I/O, and a bus line connecting these components, which are not shown in the drawing. Each process in the control units 170, 270 may be software process by executing a program stored in advance in a tangible memory device (that is, a readable, non-transitory, tangible recording medium) such as a ROM by a CPU, or may be hardware process by a dedicated electronic circuit.

The control units 170 and 270 are configured to be capable of mutually transmitting and receiving various types of information. Hereinafter, the communication between the control units 170 and 270 is referred to as inter-computer communication. The control units 170 and 270 share the angle signals DA1, DB1, DA2, and DB2 by inter-computer communication. More specifically, the first control unit 170 outputs the angle signals DA1 and DB1 to the second control unit 270, and the second control unit 270 outputs the angle signals DA2 and DB2 to the first control unit 170.

The first control unit 170 includes an abnormality monitoring unit 171 and a control calculation unit 172. The second control unit 270 includes an abnormality monitoring unit 271 and a control calculation unit 272. The abnormality monitoring units 171 and 271 perform abnormality monitoring on the angle signals DA1, DB1, DA2, and DB2, and identify a normal signal that is operably correct and an abnormal signal that is non-operable.

When it is determined that the two or more angle signals are normal, the control calculation units 172 and 272 control drive of the motor 80 based on at least one of the angle signals determined as normal and a detection value of a current sensor not shown, or the like. In addition, when the number of normal angle signals is one or less, since the abnormality monitoring cannot be continued, the drive of the motor 80 is stopped. Further, the control units 170 and 270 notify an external device (not shown) of an abnormal state of the rotation angle sensor 301.

Hereinafter, abnormality monitoring of the angle signal will be described. When the same type of element (for example, a TMR element) is used for all of the detection elements 141, 142, 241, 242, there may be a possibility that a common cause failure occurs due to a magnetic flux density abnormality. In the present embodiment, the main detection element 141 and the sub detection element 142 in the first sensor unit 131 are respectively implemented by using different type elements, a common cause failure due to a magnetic flux density abnormality hardly occurs. Similarly, in the second sensor unit 231, since different types elements are used for the main detection element 241 and the sub detection element 242, a common cause failure due to a magnetic flux density abnormality hardly occurs.

Further, since the detection elements 141 and 142 are connected to the same, first power source 191, there may be a possibility that a common cause failure occurs due to a power source abnormality. Similarly, since the detection elements 241 and 242 are connected to the same, second power source 291, there may be a possibility that a common cause failure occurs due to a power source abnormality. On the other hand, the detection elements 141 and 142 and the detection elements 241 and 242 less likely suffer from a common cause failure due to a power source abnormality. Therefore, even if two detection elements out of the detection elements 141, 142, 241, 242 become abnormal due to a common cause failure, by mutually monitoring the detection values of the remaining two detection elements, a normal sensor output is continuously obtainable.

Figure 5:
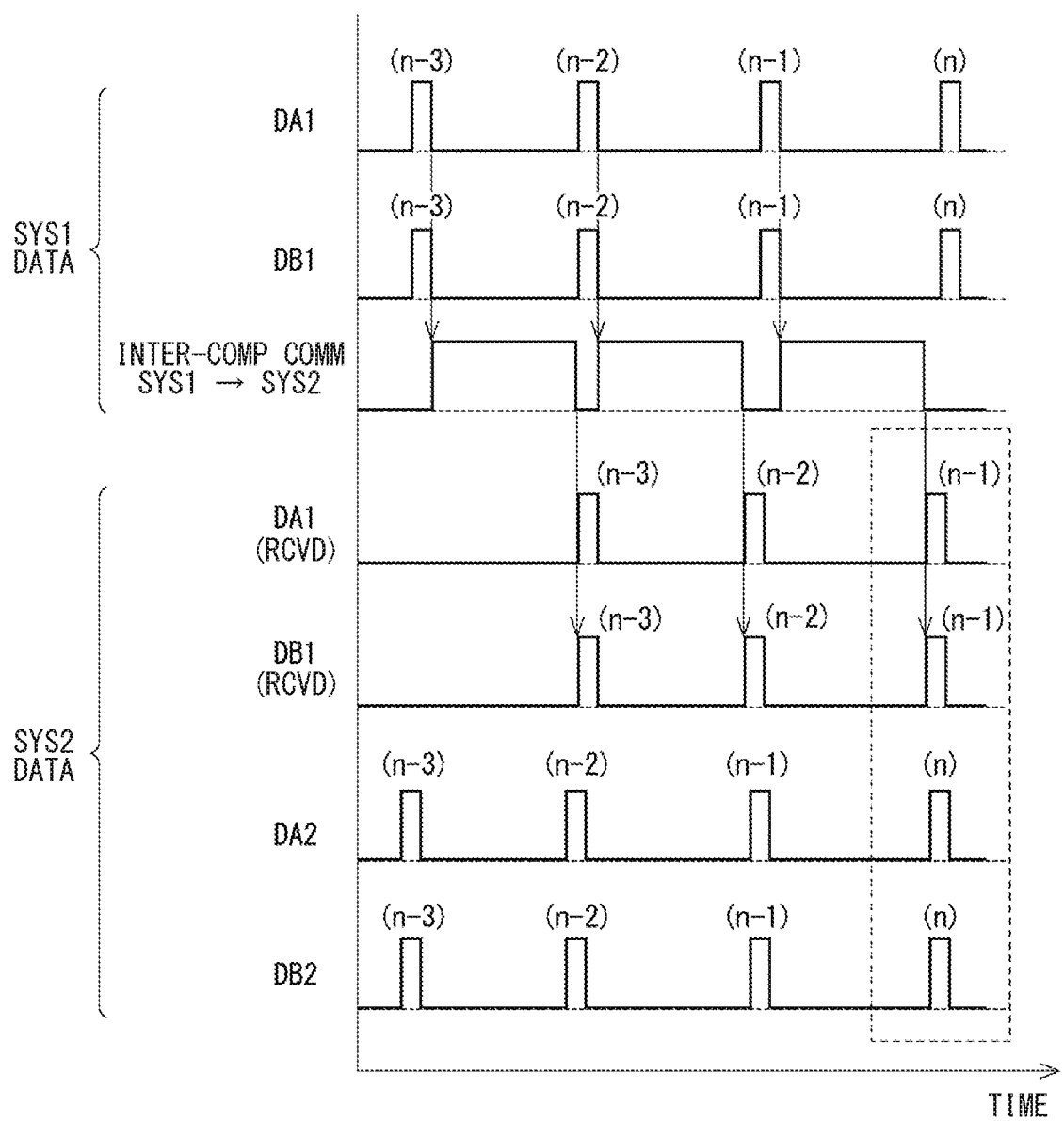
FIG. 5 is a time chart of detection timing and transmission timing of an angle signal.

As shown in FIG. 5, the second control unit 270 uses (i) the angle signals DA1 and DB1 transmitted from the first control unit 170 by the inter-computer communication and (ii) the angle signals DA2 and DB2 directly obtained from the second sensor unit 231. Therefore, data delay occurs in the angle signals DA1 and DB1. Therefore, as indicated by a broken line, if the latest value is used, previous values of the angle signals DA1 and DB1 are compared with current values of the angle signals DA2 and DB2. Therefore, there may be a possibility that a detection value changed state due to the change of the rotation of the motor 80 may be erroneously determined as sensor abnormality. Hereinafter, the second system L2 is described as a subject system, and the first system L1 is described as an other system.

Figure 6:
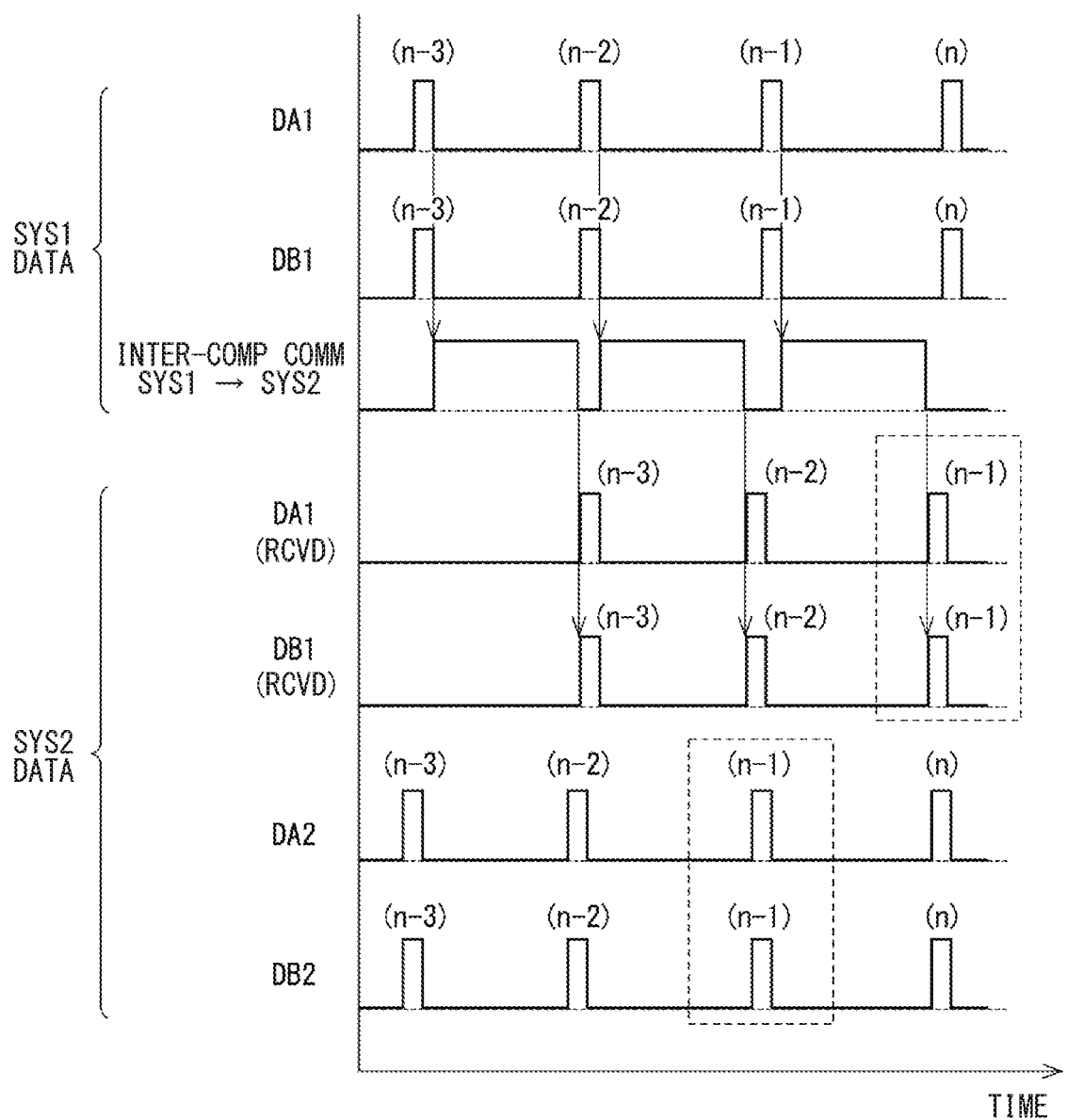
FIG. 6 is a time chart of the detection timing and the transmission timing of an angle signal according to the first embodiment.

Therefore, in the present embodiment, as shown in FIG. 6, the previous values of the angle signals DA2 and DB2 of the subject system are stored, and the previous value of the angle signal DA2 of the subject system and the current values of the angle signals DA1 and DB1 of the other systems are used for angle comparison. Although FIG. 6 shows an example in which the previous value of the subject system is held, it may be desirable to hold an optimal past value at a detection timing as close as possible to the current value according to the communication delay.

In addition, since there may be a possibility that signal detection timing and the like may be shifted between the systems due to the variation of the drive frequency of the microcomputer, a synchronization signal may be transmitted between the control units 170 and 270 at an arbitrary cycle to achieve synchronization between the systems. In addition, if the acquisition cycle of the angle data and the communication cycle between the systems are short and the variation does not affect the sensor comparison, it is not necessary to perform synchronization between the systems. Note that in FIGS. 5 and 6, the current value is described as (n), the previous value is described as (n−1), the value before previous value is described as (n−2), and the value before three cycles is described as (n−3).

The abnormality monitor process of the present embodiment will be described based on the flowchart of FIG. 7. Such a process is performed by the second control unit 270 at a predetermined cycle, and the subject system is set as the second system L2 and the other system is set as the first system L1. Note that a process performed in the first control unit 170 is describable by designating the first system L1 as the subject system and designating the second system L2 as the other, and thus the description thereof will be omitted. The same is applicable to other embodiments described later. Hereinafter, "step" of step S101 is simply indicated as a symbol "S." The same applies to the other steps.

In S101, the second control unit 270 obtains the angle signals DA2 and DB2 of the subject system from the second sensor unit 231. The angle signals read in S101 are designated as a current values DA2($n$) and DB2($n$). In addition, the obtained angle signals DA2 and DB2 are transmitted to the first control unit 170.

In S102, the second control unit 270 reads the past values of the angle signals of the subject system. The past values read out in S102 are values having matching detection timing with the signals to be received from the other system in S103, i.e., the angle signals DA2($n-1$) and DB2($n-1$), which are the previous values, are read.

In S103, the second control unit 270 receives the angle signals of the other system. Here, the angle signals DA1($n-1$) and DB1($n-1$), which are the previous values, are received due to the communication delay. In S104, the second control unit 270 performs a sensor state determination process by using the angle signals DA1($n-1$), DB1($n-1$), DA2($n-1$), and DB2($n-1$).

Figure 8:
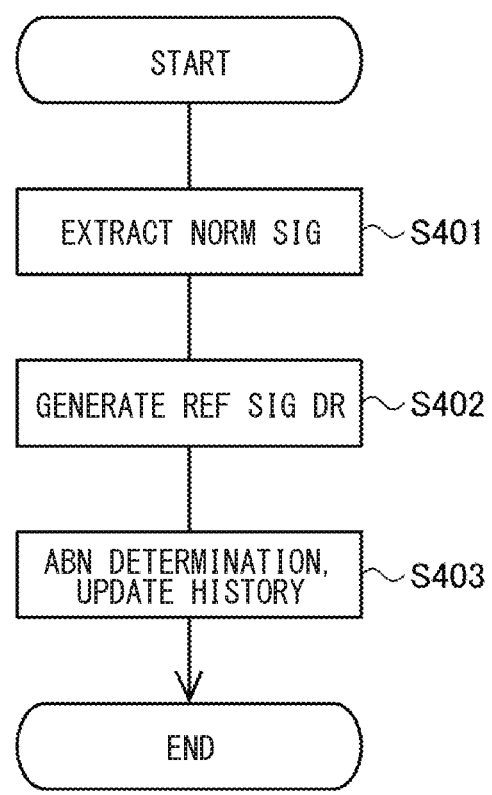
FIG. 8 is a flowchart of a sensor state determination process according to the first embodiment.

The sensor state determination process will be described based on the flowchart of FIG. 8. In a sub-flow describing the sensor state determination process, it is assumed that values having the detection timing as close as possible are used, and subscripts such as ($n-1$) related to calculation timing are omitted. The same applies to other embodiments described later.

In S401, the second control unit 270 confirms an abnormality history, and extracts normal signals from among the angle signals DA1, DB1, DA2, and DB2. It is assumed that (i) there is no initial abnormality, and (ii) all angle signals DA1, DB1, DA2, DB2 are normal in the first calculation (i.e., in the calculation in a first cycle of the process). In S402, the second control unit 270 generates a reference signal DR by using a normal signal.

In S403, the second control unit 270 performs abnormality determination of the angle signals DA1, DB1, DA2, and DB2 by using the reference signal DR. In the present embodiment, when a difference between the angle signal DA1 and the reference signal DR is equal to or less than an abnormality determination threshold TH1, the angle signal DA1 is determined as normal, and when the difference is larger than the abnormality determination threshold TH1, the angle signal DA1 is determined as abnormal. The same determination is made for the angle signals DB1, DA2, and DB2. In addition, the second control unit 270 updates abnormality history information according to the determination result.

In the present embodiment, the angle signals DA1, DB1, DA2, and DB2 of normal detection elements are summed (i.e., may also be described as "aggregated" hereafter) to generate the reference signal DR, and the generated reference signal DR is compared respectively with the angle signals DA1, DB1, DA2, and DB2, thereby the abnormality of the angle signals DA1, DB1, DA2, and DB2 is determined. If two of the angle signals DA1, DB1, DA2, and DB2 are normal, the reference signal DR is generatable, thereby mutual monitoring is continuously performable. The reference signal DR in the present embodiment is a median of the normal signals. In addition, the reference signal DR may also be an average value or a predicted value by using an estimation method such as a Kalman filter, a particle filter or the like.

Returning description to FIG. 7, in S105, the abnormality monitoring unit 171 (or 271, when the second control unit 270 is part of the subject system) determines whether there are two or more normal signals. Here, although the determination value whether to continue control is set to 2, according to the number of sensors or system configuration, the determination value may be set to a value other than two. If it is determined that there are two or more normal signals (S105:YES), the process proceeds to S106. In S106, the control calculation unit 172 performs calculation related to a drive control of the motor 80 by using an arbitrary normal signal or an aggregate value of a plurality of normal signals. The aggregate value used for the drive control may be the same as the reference signal DR, or may be a value obtained by a different calculation from that of the reference signal DR.

When the angle signals DA2 and DB2 are normal, the angle signal DA2($n$), which is the current value of the angle signal DA2, is compared with the angle signal DB2($n$), which is the current value of the angle signal DB, and, if the difference between DA2($n$) and DB2($n$) is equal to or less than the abnormality determination threshold, it may be desirable to use at least one of the angle signal DA2($n$) and the angle signal DB2($n$) for control.

If it is determined that the number of normal signals is one or less (S105:NO), it is determined that the rotation angle sensor 301 is abnormal, and the process proceeds to S107. In S107, the second control unit 270 stops the output of the angle signal, and stops the drive control of the motor 80.

In the present embodiment, when the plurality of control units 170 and 270 obtain the angle signals from the sensor units 131 and 231 provided correspondingly, and share them by inter-computer communication, a data delay occurs. Thus, when comparing the values shared among the systems, the values having matching detection timing are compared. In such manner, it is appropriately determinable in terms of whether the angle signal is normal or not. Further, by identifying a normal sensor and an abnormal sensor, a control by using the normal sensor is continuable.

As described above, the ECU 10 includes the plurality of sensor units 131 and 231 and the plurality of control units 170 and 270. The plurality of sensor units 131 and 231 include detection elements 141, 142, 241 and 242, and angle calculation units 151, 152, 251 and 252. The detection elements 141, 142, 241, 242 detect a change in the magnetic field due to the rotation of the magnet 875 as a "change in physical quantity." The angle calculation units 151, 152, 251, 252 calculate the angle signals DA1, DB1, DA2, DB2 which are physical quantity calculation values according to or corresponding to the detection values of the detection elements 141, 142, 241, 242.

The control units 170 and 270 include the abnormality monitoring units 171 and 271 and the control calculation units 172 and 272, and obtain the angle signals from different sensor units. More specifically, the first control unit 170 obtains the angle signals DA1 and DB1 from the first sensor unit 131, and the second control unit 270 obtains the angle signals DA2 and DB2 from the second sensor unit 231. The abnormality monitoring units 171 and 271 monitor abnormality in the angle signals DA1, DB1, DA2, and DB2. The control calculation units 172 and 272 perform calculation using the angle signals.

A combination of the first control unit 170 and the first sensor unit 131 from which the first control unit 170 obtains the angle signals DA1 and DB1 is designated as a first system L1, and a combination of the second control unit 270 and the second sensor unit 231 from which the second control unit 270 obtains the angle signals DA2 and DB2 is a second system L2. The second control unit 270, which is the "at least one control unit," obtains the angle signals DA2 and DB2 which are the other system calculation values by communication from the first control unit 170 which is the other control unit. When the abnormality monitoring unit 271 compares the angle signals DA2 and DB2 that are the subject system calculation values with the angle signals DA1 and DB1 that are the other system calculation values, the abnormality monitoring unit 271 uses, either as the angle signals DA1 and DB1 or as the angle signals DA2 and DB2, a communication delay corrected value in which the communication delay is corrected (i.e., is taken into consideration). In such manner, since the abnormality monitoring is performed by comparing the angle signals having matching detection timing matched as much as possible, abnormality of the angle signal is appropriately detectable.

In the present embodiment, the past values of the angle signals DA2 and DB2 detected at a timing earlier than the timing at which the angle signals DA1 and DA2 are obtained by an amount of time corresponding to the communication delay are used as the communication delay corrected value. The second control unit 270 holds the past values of the angle signals DA2 and DB2, and the past values detected at a timing earlier by an amount of time corresponding to the communication delay than the timing at which the angle signals DA1 and DB1 are obtained are used as the communication delay corrected values, for comparison with the angle signals DA1, DB1. In such manner, the detection timing of the angle signals used for comparison is arrange, i.e., matched, appropriately. Here, although the second control unit 270 has been described as an example, the same applies to the first control unit 170. The same also applies to the following embodiments.

The at least one detection element has a different configuration from the other detection element(s). In such manner, an abnormality caused by the common cause is reducible. In the present embodiment, by making the configurations of the detection elements 141 and 142 respectively different from each other, occurrence of abnormality due to a common cause in the system is reduced.

In the present embodiment, the reference signal DR is calculated by using at least two of the angle signals DA1, DB1, DA2, and DB2, and abnormality monitoring is performed by a comparison with the reference signal DR. In such manner, abnormality monitoring of the angle signal DA1, DB1, DA2, DB2 is appropriately performable.

The detection target of the present embodiment is the magnet 875 that rotates integrally with the rotor 860 of the motor 80, and the detection elements 141, 142, 241, 242 detect the change of the magnetic field due to the rotation of the magnet 875 as the "change of physical quantity." In such manner, the rotation position of the rotor 860 is appropriately detectable, and the drive of the motor 80 is appropriately controllable by using the normal signal. Further, the electric power steering apparatus 8 includes an ECU 10 and a motor 80. Thereby, the steering assist is appropriately controllable using the normal signal.

Second Embodiment

The second embodiment will be described based on FIG. 9 and FIG. 10. In the present embodiment, the abnormality monitor process is different from that of the first embodiment, on which the following description is focused. As described in the above embodiment, when the angle signal is shared between the systems, a communication delay occurs. Therefore, in the present embodiment, as shown in FIG. 9, an estimation value taking into consideration the delay in the inter-computer communication is estimated and transmitted to the other system, so that the detection timing of the data (i.e., angle signal) in the subject system matches the latest data in the transmission destination system, for use in the other system.

Figure 9:
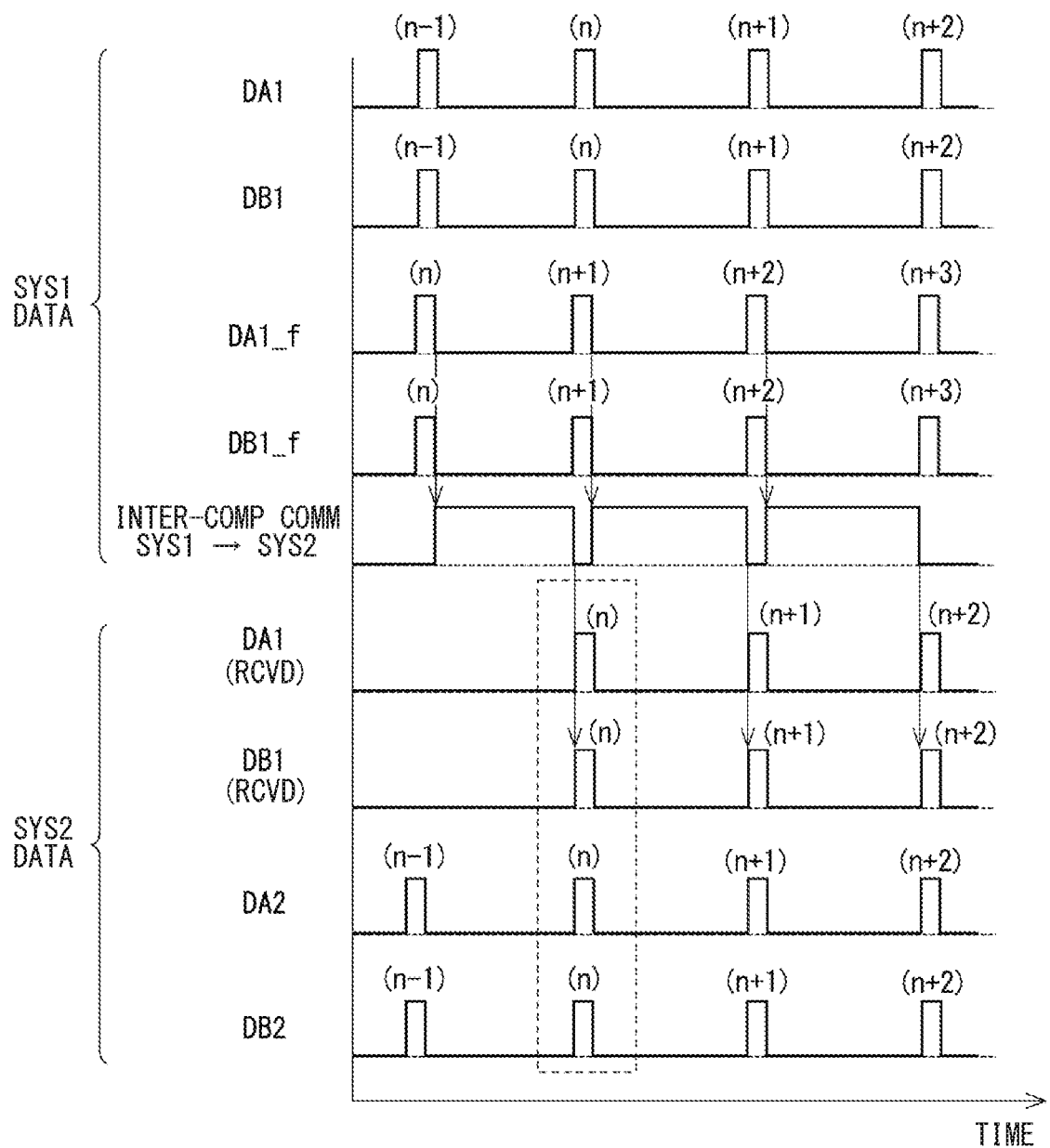
FIG. 9 is a time chart of the detection timing and the transmission timing of the angle signal according to a second embodiment.
Figure 10:
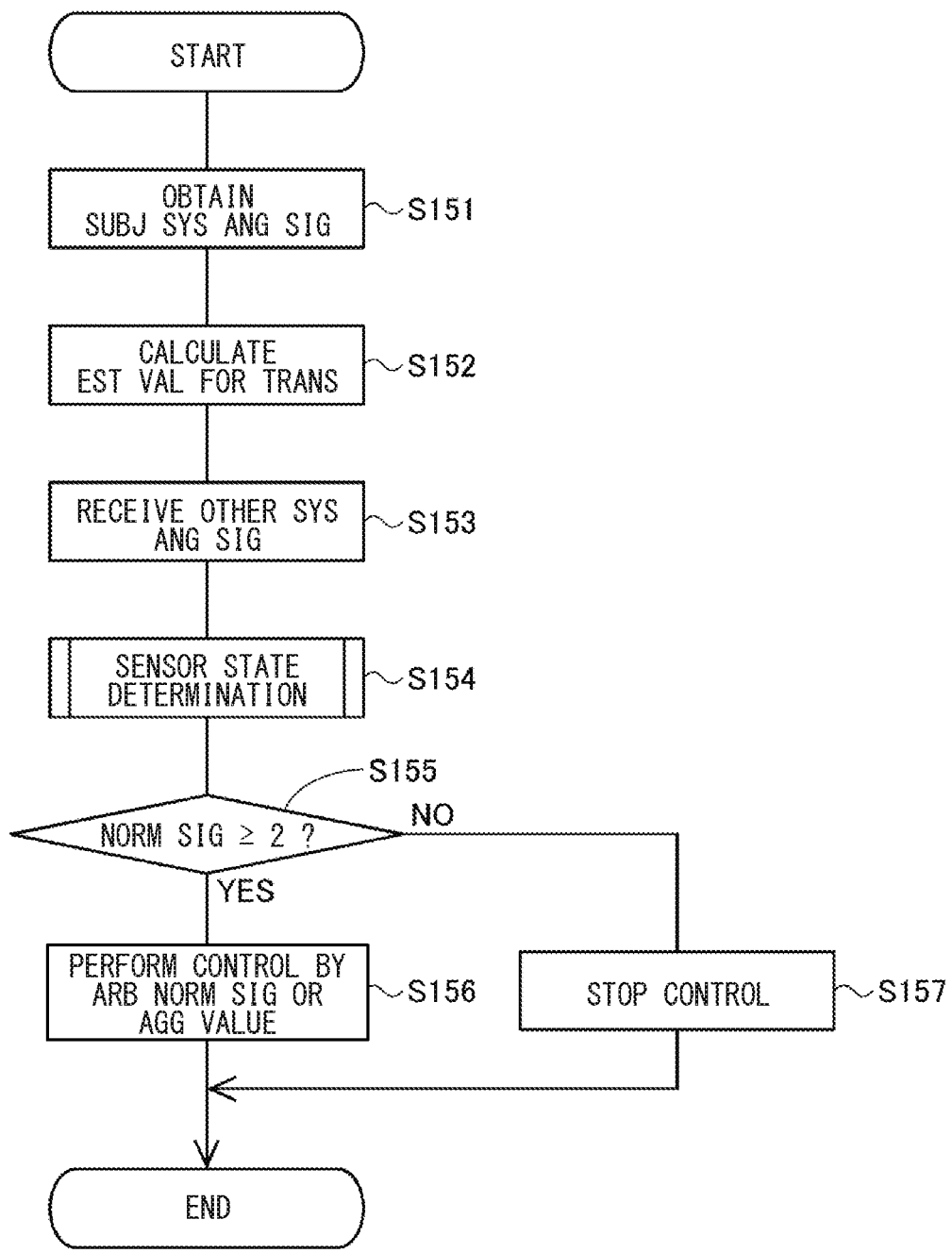
FIG. 10 is a flowchart of the abnormality monitor process according to the second embodiment.

In an example shown in FIG. 9, the current value estimated based on the previous value is transmitted, and the angle comparison is performed between the values having the matching detection timing. That is, the first control unit 170 calculates an estimation value $DA1\_f(n)$ by using the previous value $DA1(n-1)$, and transmits the estimation value $DA1\_f(n)$ to the second control unit 270. The second control unit 270 compares the angle signal $DA2(n)$ which is the latest value obtained in the subject system with the estimation value $DA1\_f(n)$ obtained from the other system. Similarly, an estimation value $DA1\_f(n+1)$ is calculated by using the angle signal $DA1(n)$ and is used for comparison with an angle signal $DA2(n+1)$, and an angle estimation value $DA1\_f(n+2)$ is calculated by using the angle signal $DA1(n+1)$ and is used for comparison with the angle signal $DA2(n+2)$. The same applies to the angle signal DB1. The transmission of the angle signals DA2 and DB2 from the second system L2 to the first system L1 is also the same.

The angle estimation values $DA1\_f$ and $DB1\_f$ are respectively calculated as a value that has taken the communication delay into consideration, thereby, after transmission to the other system, serving as a value of the matching detection timing at which the angle signal of the other system is obtained. The angle estimation values $DA2\_f$ and $DB2\_f$ are derivable, for example, by calculating an angle change corresponding to the timing shift of obtaining data between the two systems and by adding the angle change so calculated to the current values $DA2(n)$ and $DB2(n)$. Further, the angle estimation values $DA2\_f$ and $DB2\_f$ may be estimated by using a plurality of past data. For example, the estimation method may be selected in consideration of the calculation load, the influence of an error, and the like, from among an omega filter, a Kalman filter, a complementary filter, a particle filter and the like.

The abnormality monitor process of the present embodiment will be described based on the flowchart shown in FIG. 10. The process of S151 is the same as S101 in FIG. 7. In S152, the second control unit 270 calculates the angle estimation values $DA2\_f$ and $DB2\_f$ of the subject system. The calculated angle estimation values $DA2\_f$ and $DB2\_f$ are transmitted to the first control unit 170.

In S153, the second control unit 270 receives the angle estimation values $DA1\_f$ and $DB1\_f$ of the other system from the first control unit 170. The processes of S154 to S157 are the same as the processes of S105 to S107 in FIG. 7.

In the present embodiment, the communication delay corrected value is a predicted value of each of the angle signals DA1, DB1 of the other system which includes a predicted amount of correction caused by the communication delay (i.e., a value derived by using a predicted amount of change, i.e., correction, during a time amount of the communication delay), i.e., the angle estimation values $DA1\_f$, $DB1\_f$. The second control unit 270 uses the angle estimation values $DA1\_f$ and $DB1\_f$ for comparison with the angle signals DA2 and DB2. In such manner, after performing the abnormality determination about the latest value detected in the subject system, the "examined" value is used for control. Further, the same effects as the above embodiment is achievable by the present embodiment.

Third Embodiment

Figure 11:
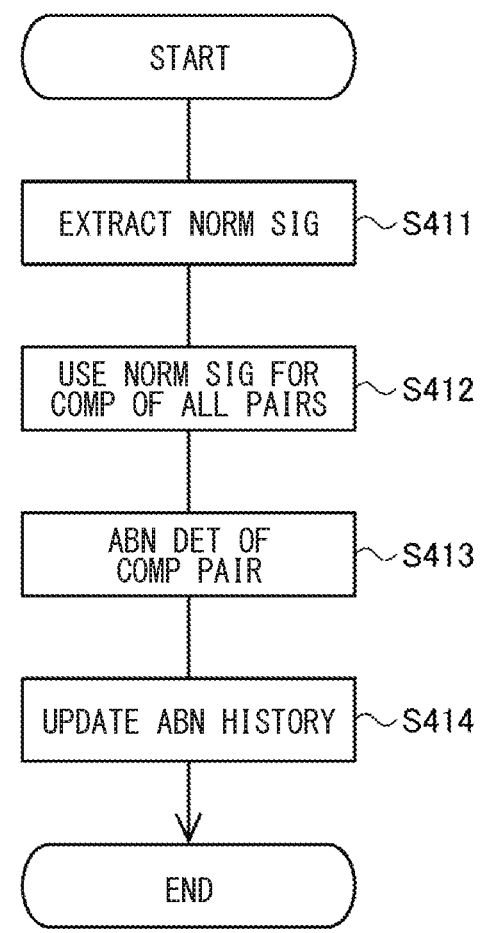
FIG. 11 is a flowchart of the sensor state determination process according to a third embodiment.

The third embodiment is shown in FIG. 11. The third to seventh embodiments each will describe the sensor state determination process. The third to seventh embodiments are applicable to both of the first embodiment and the second embodiment.

The sensor state determination process of the present embodiment will be described based on the flowchart of FIG. 11. S411 in FIG. 11 is the same as S401 in FIG. 8. In S412, the second control unit 270 uses the normal signal to perform signal comparison in all pairs. In S413, the second control unit 270 performs abnormality determination on the comparison pair. When an output difference ΔD between the two compared signals is equal to or less than an abnormality determination threshold TH2, the comparison result is determined as normal, and the comparison pair is determined as a normal pair. When the output difference ΔD between the two compared signals is larger than the abnormality determination threshold TH2, the comparison result is determined as abnormal, and the comparison pair is determined as an abnormal pair.

In S414, the second control unit 270 identifies an abnormal signal, and updates the abnormality history information. In the present embodiment, assuming that the number of normal sensors used in S412 is designated as n, the angle signal determined as an abnormal pair by (n−1) times is identified as an abnormal signal.

In the present embodiment, two angle signals DA1, DB1, DA2, and DB2 are compared, and a normal signal is identified according to whether the comparison result is normal or not. In the present embodiment, angle signals are compared in all combinations to identify an abnormal signal. In such manner, if there are two or more normal signals, control using the normal angle signal is continuable. Further, the same effects as the above embodiments are achievable by the present embodiment.

Fourth Embodiment, Fifth Embodiment

Figure 12:
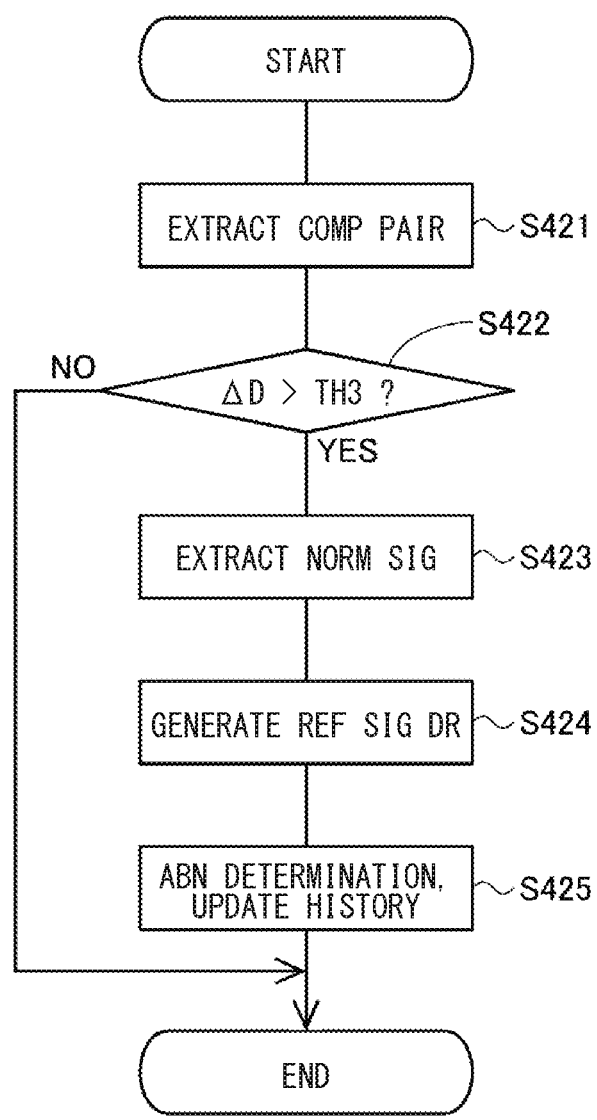
FIG. 12 is a flowchart of the sensor state determination process according to a fourth embodiment.
Figure 13:
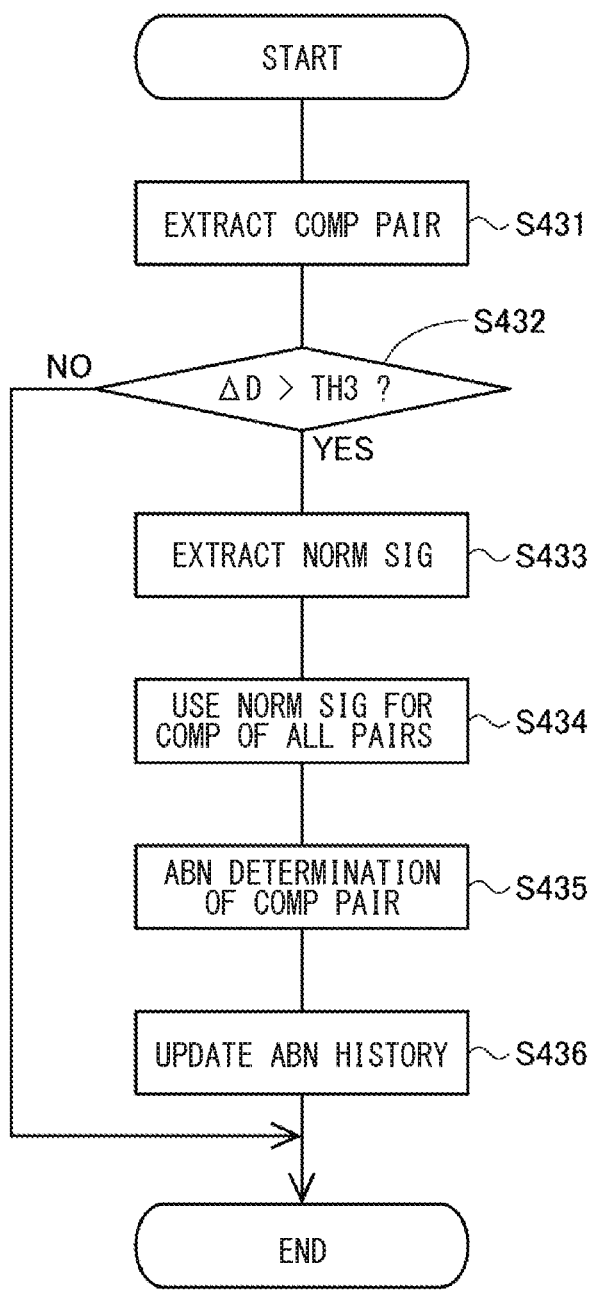
FIG. 13 is a flowchart of the sensor state determination process according to a fifth embodiment.

The fourth embodiment is shown in FIG. 12, and the fifth embodiment is FIG. 13. In the present embodiment, an arbitrary signal comparison pair is set in advance as a default pair, and signal comparison is performed in such comparison pair. Further, if the comparison result in the default pair is abnormal, a new pair is searched for, and a pair whose output difference ΔD is equal to or less than an abnormality determination threshold TH3 is set as a new signal comparison pair. By searching for a combination of normal sensors only when an abnormality occurs, it is possible to reduce the calculation load as compared to the case where an abnormal sensor is searched each time. When searching for a new comparison pair, in the fourth embodiment, a normal signal is identified by the method of the first embodiment, and in the fifth embodiment, a normal signal is identified by the method of the third embodiment.

The sensor state determination process of the fourth embodiment will be described based on the flowchart of FIG. 12. In S421, the second control unit 270 extracts the angle signals of the comparison pair to be compared. Here, it is assumed that the angle signals DA1 and DB1 are set by default as a comparison pair. Also, two or more sets may be set as default such as, for example, the angle signals DA1 and DB1 and the angle signals DA2 and DB2.

In S422, the second control unit 270 determines whether the output difference ΔD, which is a difference between the angle signals of the comparison pair, is larger than the abnormality determination threshold TH3. If it is determined that the output difference ΔD is equal to or less than the abnormality determination threshold TH3 (S422:NO), it is determined that the angle signals of the comparison pair are normal, the process of S423 proceeds to S105 in FIG. 7, instead of proceeding to S423. If it is determined that the output difference ΔD is larger than the abnormality determination threshold TH3 (S422:YES), the process proceeds to S423.

Figure 7:
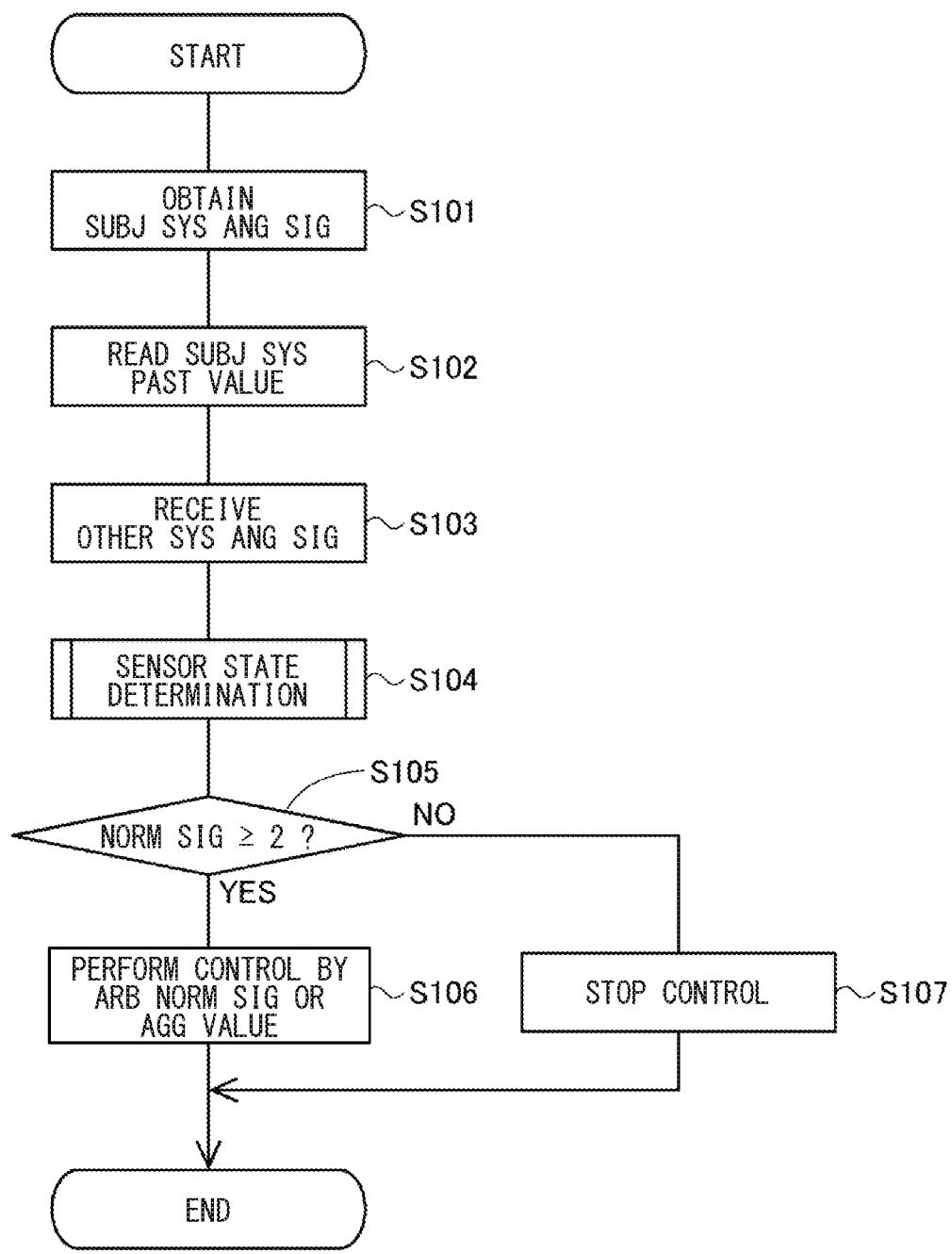
FIG. 7 is a flowchart of an abnormality monitor process according to the first embodiment.

The processes of S423 to S425 are processes of searching for a new pair for identifying a normal signal, and are similar to the processes of S101 to S103 in FIG. 7. Subsequently to S425, the process proceeds to S105 in FIG. 7, and, when it is determined that there are two or more normal signals, any two of the normal signals are set as a new pair.

The sensor state determination process of the fifth embodiment will be described based on the flowchart of FIG. 13. The processes of S431 and S432 are the same as the processes of S421 and S422 in FIG. 12. The processes of S433 to S436 are the same as the processes of S411 to S414 in FIG. 11. Subsequently to S436, the process proceeds to S105 in FIG. 7, and, when it is determined that there are two or more normal signals, any two of the normal signals are set as a new pair.

In the present embodiment, the abnormality monitoring unit 271 performs abnormality monitoring by performing a comparison of two values, with at least one subject-to-comparison pair of two values having been set in advance. If the comparison result of the subject-to-comparison pair is normal, the values of the subject-to-comparison pair are identified as normal. If the comparison result of the subject-to-comparison pair is abnormal, a new pair having a normal comparison result is searched for, and if there is a new pair having a normal comparison result, the values of the new pair having a normal comparison result are identified as normal, and at least one normal comparison pair is newly set as a subject-to-comparison pair for the next and subsequent comparisons. In such manner, the normal signal is appropriately identifiable. In addition, compared to the case of searching for an abnormal sensor each time, the calculation load is reducible. Further, the same effects as the above embodiments are achievable by the present embodiment.

Sixth Embodiment

Figure 15:
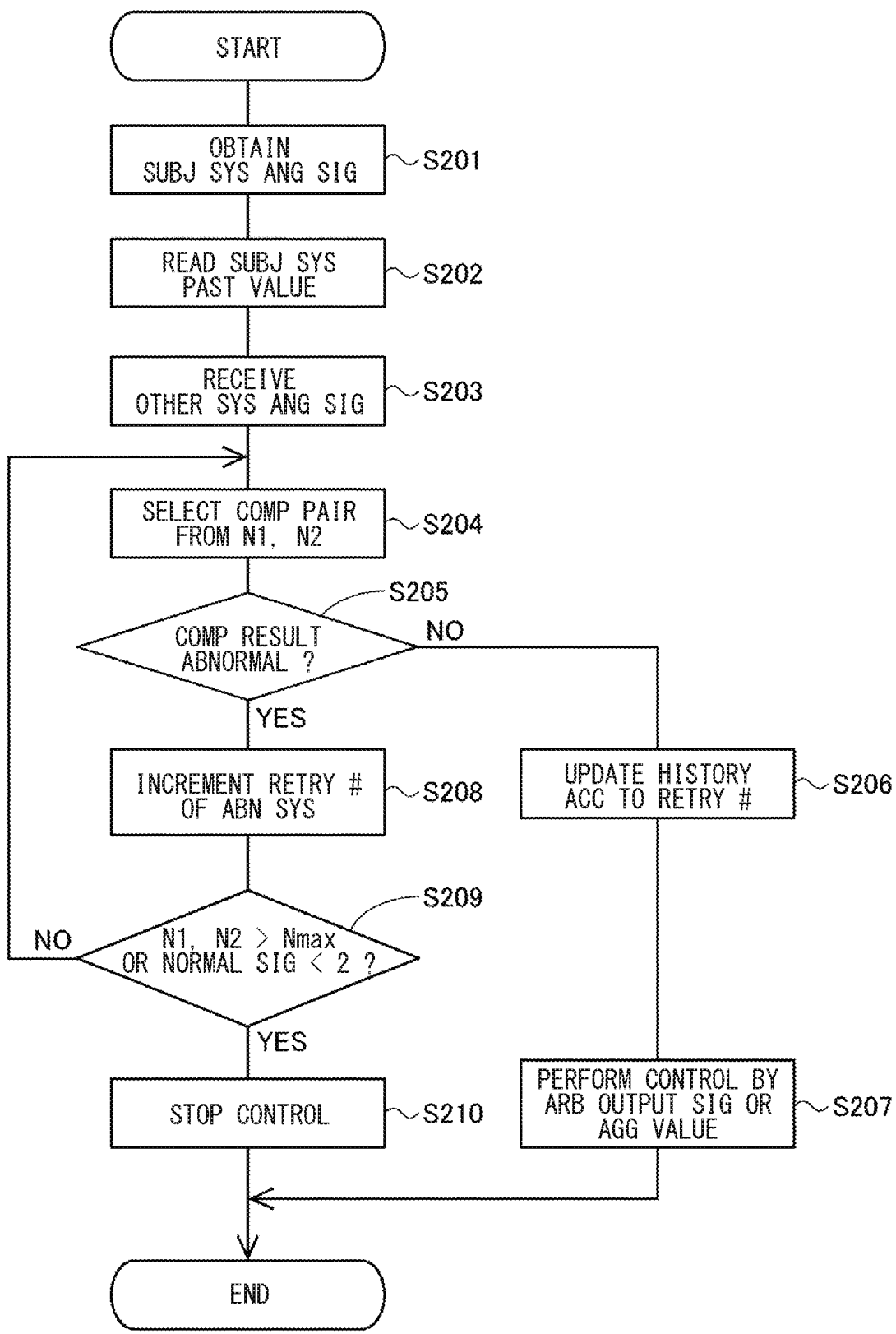
FIG. 15 is a flowchart of the abnormality monitor process according to the sixth embodiment.

The sixth embodiment is shown in FIG. 14 and FIG. 15. In the present embodiment, signal comparison is performed in pairs, which are stored in advance in a storage unit (not shown) such as a non-volatile memory or the like, without performing comparisons of all pairs or aggregating output values of all sensors. Each pair is prepared by two sets for output and for abnormality monitoring, and if the comparison result is normal, the signal set for output is used for control. If the comparison result is abnormal, the comparison pair is replaced with a new one, which has been set in advance, according to the number of retries.

A retry table is described based on FIG. 14. The retry table is stored in a storage unit (not shown). The value for output of the first system L1 is used for the energization control of the first motor winding 180, and the value for output of the second system L2 is used for the energization control of the second motor winding 280. Further, one of the values for output, i.e., one for the system L1 or for the system L2, or the aggregate value may be used for the energization control of the motor windings 180 and 280.

First, the system L1 is described. In the system L1, the detection value of the first sensor unit 131 is prioritized. The priorities of the values to be used for output of the system L1 are, from high to low, DA1, DB1, and DA2. When the number of retries N1 is 0, a comparison pair is made up from the angle signal DA1 for output and the angle signal DB1 for abnormality monitoring. If the comparison result is normal, the angle signal DA1 is output, and if abnormal, the number of retries N1 is set to 1.

When the number of retries N1 is 1, a comparison pair is made up from the angle signal DA1 for output and the angle signal DA2 for abnormality monitoring. If the comparison result is normal, the angle signal DA1 is output, and the abnormality history information is updated with a record of the abnormality determination of the angle signal DB1 based on a determination of abnormality of the angle signal DB1. If the comparison result is abnormal, the number of retries N1 is set to 2.

When the number of retries N1 is 2, a comparison pair is made up from the angle signal DA1 for output and the angle signal DB2 for abnormality monitoring. If the comparison result is normal, the angle signal DA1 is output, and the abnormality history information is updated with a record of the abnormality determination of the angle signals DB1 and DA2 based on a determination of abnormality of the angle signals DB1 and DA2. If the comparison result is abnormal, the number of retries N1 is set to 3.

When the number of retries N1 is 3, a comparison pair is made up from the angle signal DB1 for output and the angle signal DA2 for abnormality monitoring. If the comparison result is normal, the angle signal DB1 is output, and the abnormality history information is updated with a record of the abnormality determination of the angle signal DA1 based on a determination of abnormality of the angle signal DA1. If the comparison result is abnormal, the number of retries N1 is set to 4.

When the number of retries N1 is 4, a comparison pair is made up from the angle signal DB1 for output and the angle signal DB2 for abnormality monitoring. If the comparison result is normal, the angle signal DB1 is output, and the abnormality history information is updated with a record of the abnormality determination of the angle signals DA1 and DA2 based on a determination of abnormality of the angle signals DA1 and DA2. If the comparison result is abnormal, the number of retries N1 is set to 5.

When the number of retries N1 is 5, a comparison pair is made up from the angle signal DA2 for output and the angle signal DB2 for abnormality monitoring. If the comparison result is normal, the angle signal DA2 is output, and the abnormality history information is updated with a record of the abnormality determination of the angle signals DA1 and DB1 based on a determination of abnormality of the angle signals DA1 and DB1.

Next, the system L2 is described. In the system L2, the detection value of the second sensor unit 231 is prioritized. The priorities of the values to be used for output of the system L2 are, from high to low, DA2, DB2, and DA1. When the number of retries N2 is 0, a comparison pair is made up from the angle signal DA2 for output and the angle signal DB2 for abnormality monitoring. If the comparison result is normal, the angle signal DA2 is output, and if abnormal, the number of retries N2 is set to 1.

When the number of retries N2 is 1, a comparison pair is made up from the angle signal DA2 for output and the angle signal DA1 for abnormality monitoring. If the comparison result is normal, the angle signal DA2 is output, and the abnormality history information is updated with a record of the abnormality determination of the angle signal DB2 based on a determination of abnormality of the angle signal DB2. If the comparison result is abnormal, the number of retries N2 is set to 2.

When the number of retries N2 is 2, a comparison pair is made up from the angle signal DA2 for output and the angle signal DB1 for abnormality monitoring. If the comparison result is normal, the angle signal DA2 is output, and the abnormality history information is updated with a record of the abnormality determination of the angle signals DB2 and DA1 based on a determination of abnormality of the angle signals DB2 and DA1. If the comparison result is abnormal, the number of retries N2 is set to 3.

When the number of retries N2 is 3, a comparison pair is made up from the angle signal DB2 for output and the angle signal DA1 for abnormality monitoring. If the comparison result is normal, the angle signal DB2 is output, and the abnormality history information is updated with a record of the abnormality determination of the angle signal DA2 based on a determination of abnormality of the angle signal DA2. If the comparison result is abnormal, the number of retries N2 is set to 4.

When the number of retries N2 is 4, a comparison pair is made up from the angle signal DB2 for output and the angle signal DB1 for abnormality monitoring. If the comparison result is normal, the angle signal DB2 is output, and the abnormality history information is updated with a record of the abnormality determination of the angle signals DA2 and DA1 based on a determination of abnormality of the angle signals DA2 and DA1. If the comparison result is abnormal, the number of retries N2 is set to 5.

When the number of retries N2 is 5, a comparison pair is made up from the angle signal DA1 for output and the angle signal DB1 for abnormality monitoring. If the comparison result is normal, the angle signal DA1 is output, and the abnormality history information is updated with a record of the abnormality determination of the angle signals DA2 and DB2 based on a determination of abnormality of the angle signals DA2 and DB2.

The abnormality monitor process of the present embodiment is described based on the flowchart of FIG. 15. The processes of S201 to S203 are the same as S101 to S103 in FIG. 7. In S204, the second control unit 270 selects a comparison pair of each system from (i.e., according to) the number of retries N1 of the first system and the number of retries N2 of the second system. In other words, in the present embodiment, it can be understood that a default pair is set for each system.

In S205, the second control unit 270 determines whether the comparison result of the comparison pair selected in S204 is abnormal or not. If it is determined that the comparison result of at least one comparison pair is abnormal (S205:YES), the process proceeds to S208. If it is determined that the comparison results of all comparison pairs are normal (S205:NO), the process proceeds to S206.

In S206, the second control unit 270 refers to the retry table, and updates the abnormality history information according to the number of retries. In S207, the second control unit 270 performs a calculation related to drive control of the motor 80 by using (i) an arbitrary angle signal for output or (ii) an aggregate value of the angle signals for output.

In S208, which is transitioned to when the comparison result of the selected comparison pair is abnormal (S205: YES), the second control unit 270 increments the number(s) of retries N1 and/or N2 of the abnormal system(s). For example, if the comparison result of the system L1 is abnormal and the comparison result of the system L2 is normal, the number of retries N1 related to the system L1 is incremented, and the number of retries N2 related to the system L2 is not incremented.

In S209, the second control unit 270 determines whether the numbers of retries N1 and N2 of all systems are larger than a retry maximum value Nmax (i.e., 5 in the present embodiment) or whether the number of normal signals is less than 2. If it is determined that (i) at least one of the numbers of retries N1 and N2 of the two systems is less than the retry maximum value Nmax and (ii) the number of normal signals is 2 or more (S209:NO), the process returns to S204 and performs a retry. Note that, in the process of S209, the number of normal signals is counted, based on an assumption that a signal not yet determined as abnormal is considered as normal. In S210, which is transitioned to when it is determined that (i) the numbers of retries N1 and N2 of all systems are larger than the retry maximum value Nmax or (ii) the number of normal signals is less than 2 (S209: YES), it is determined that the rotation angle sensor 301 is abnormal, and the drive control of the motor 80 is stopped just like S107 in FIG. 7.

The abnormality monitoring unit performs abnormality monitoring by comparing two values, and performs retry when the comparison result is abnormal, and a subject-to-comparison pair is set in advance according to the number of retries, for an identification of an abnormal value according to the number of retries. In such manner, the normal signal is appropriately identifiable. Further, the calculation load related to the identification of the abnormal signal is reducible. Further, the same effects as the above embodiments are achievable by the present embodiment.

Seventh Embodiment

Figure 16:
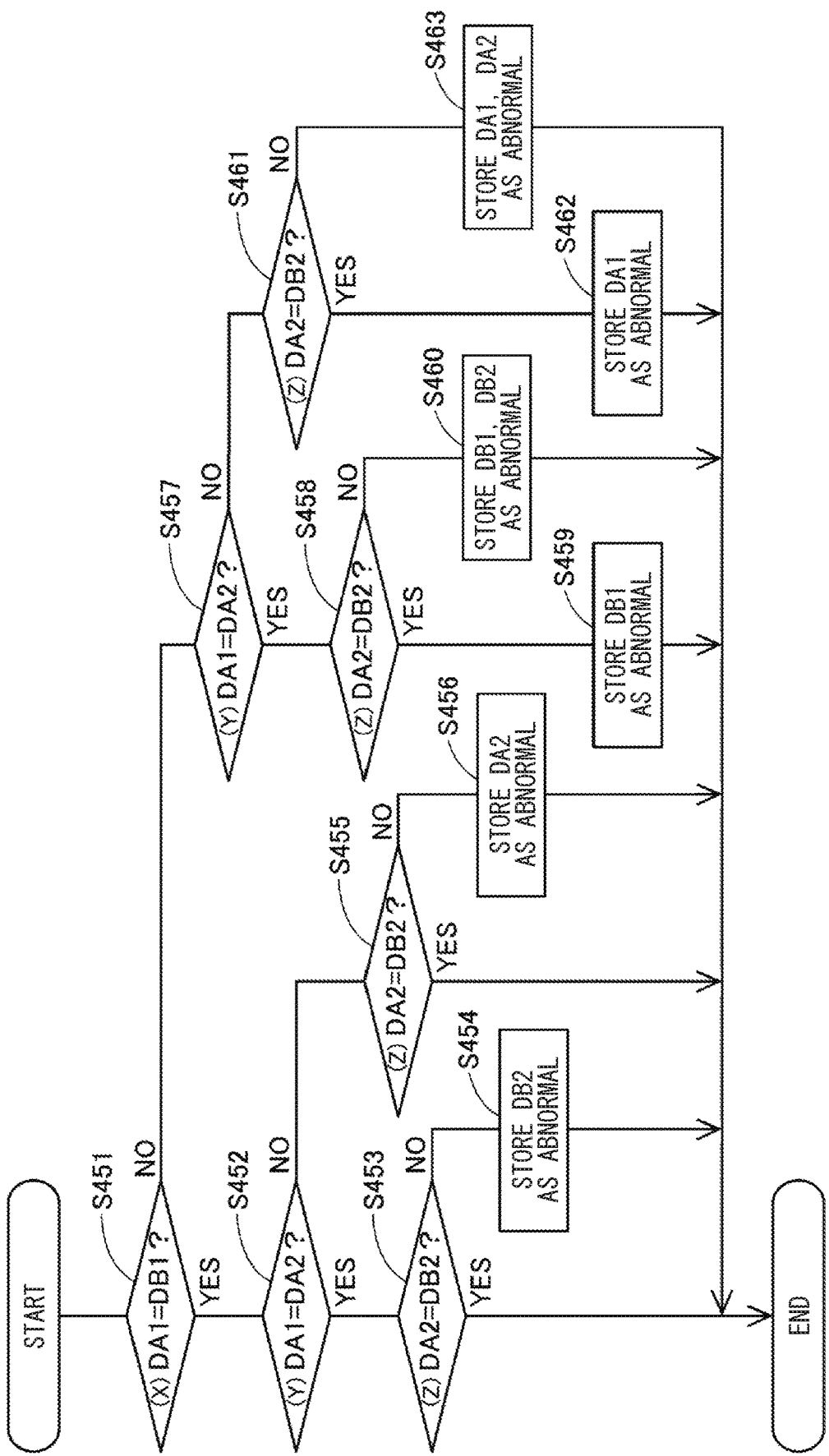
FIG. 16 is a flowchart of the sensor state determination process according to a seventh embodiment.

The seventh embodiment is shown in FIG. 16. In the seventh embodiment, the angle signals DA1 and DA2 for output at a normal time and the angle signals DB1 and DB2 for abnormality monitoring are used, and the angle signals DA1 and DA2 for output are compared with two signals, and the angle signals DB1 and DB2 are compared with one signal for abnormality monitoring. More specifically, the angle signal DA1 is compared with the angle signals DB1 and DA2, and the angle signal DA2 is compared with the angle signals DB2 and DA1. The angle signal DB1 is compared with the angle signal DA1, the angle signal DB2 is compared with the angle signal DA2, and the angle signal DB1 and the angle signal DB2 are not compared with each other. Hereinafter, a comparison of the angle signals DA1 and DB1 may be referred to as "comparison X", a comparison of the angle signals DA1 and DA2 as "comparison Y", and a comparison of the angle signals DA2 and DB2 as "comparison Z." In the flowchart of FIG. 16, comparisons X, Y and Z are shown in parentheses.

In the present embodiment, the detection elements 141 and 241 for control and the detection elements 142 and 242 for abnormality monitoring have respectively different characteristics, and are assumed as having no simultaneous failure (i.e., will not be broken at the same time). Further, in a situation like power source abnormality, the detection elements 141 and 142 may suffer simultaneous failure. However, power source abnormality may separately be detected and attended, and the comparison scheme of the present embodiment may be performed during a power source normal time.

A sensor state identification process of the present embodiment is described based on the flowchart of FIG. 16. In the present embodiment, when (i) an output difference ΔD of the two pieces of signal information is equal to or less than an abnormality determination threshold TH4 and (ii) the comparison result is normal, it is described as "DA1=DB1." Further, in a signal comparison step, when the abnormality history information has a record, indicating that an abnormality has occurred in at least one of the signals used for comparison in a process before the previous process, "abnormal comparison result" is determined without performing a comparison process. That is, in the signal comparison step, when there is no abnormality history and the output difference ΔD is equal to or less than the abnormality determination threshold TH4, it is considered as "comparison result is normal", and when there is an abnormality history, or the output difference ΔD is larger than the abnormality determination threshold TH4, it is considered as "comparison result is abnormal."

In S451, the second control unit 270 determines whether the result of comparison between the angle signals DA1 and DB1 is normal. If it is determined that the comparison result of the angle signals DA1 and DB1 is abnormal (S451:NO), the process proceeds to S457. If it is determined that the comparison result of the angle signals DA1 and DB1 is normal (S451:YES), the process proceeds to S452.

In S452, the second control unit 270 determines whether the result of comparison between the angle signals DA1 and DA2 is normal. If it is determined that the comparison result of the angle signals DA1 and DA2 is abnormal (S452:NO), the process proceeds to S455. If it is determined that the comparison result of the angle signals DA1 and DA2 is normal (S452:YES), the process proceeds to S453.

In S453, the second control unit 270 determines whether the result of comparison between the angle signals DA2 and DB2 is normal. If it is determined that the comparison result of the angle signals DA2 and DB2 is normal (S453:YES), that is, if all the comparisons X, Y and Z are normal, all the angle signals DA1, DB1, DA2 and DB2 are determined as normal, and the process proceeds to S105 of FIG. 7. If it is determined that the comparison result of the angle signals DA2 and DB2 is abnormal (S453:NO), that is, if the comparisons X and Y are normal and the comparison Z is abnormal, the process proceeds to S454 and the angle signal DB2 is determined as abnormal, and information indicating that the angle signal DB2 is abnormal is stored in abnormality history information. Then, the process proceeds to S105 of FIG. 7.

In S455, to which the process proceeds when a negative determination is made in S452, the second control unit 270 determines whether the result of comparison between the angle signals DA2 and DB2 is normal. If it is determined that the comparison result of the angle signals DA2 and DB2 is normal (S455:YES), that is, if the comparisons X and Z are normal and the comparison Y is abnormal, the process proceeds to S105 of FIG. 7. If it is determined that the comparison result of the angle signals DA2 and DB2 is abnormal (S455:NO), that is, if the comparison X is normal and the comparisons Y and Z are abnormal, the process proceeds to S456 and the angle signal DA2 is determined as abnormal, and information indicating that the angle signal DA2 is abnormal is stored in the angle history information. Then, the process proceeds to S105 of FIG. 7.

In step S457, to which the process proceeds when a negative determination is made in step S451, the second control unit 270 determines whether the result of comparison between the angle signals DA1 and DA2 is normal. If it is determined that the comparison result of the angle signals DA1 and DA2 is abnormal (S457:NO), the process proceeds to S461. If it is determined that the comparison result of the angle signals DA1 and DA2 is normal (S457:YES), the process proceeds to S458.

In S458, the second control unit 270 determines whether the result of comparison between the angle signals DA2 and DB2 is normal. If it is determined that the comparison result of the angle signals DA2 and DB2 is normal (S458:YES), that is, if the comparisons Y and Z are normal and the comparison X is abnormal, the process proceeds to S459 and the angle signal DB1 is determined as abnormal, and information indicating that the angle signal DB1 is abnormal is stored in the angle history information. Then, the process proceeds to S105 of FIG. 7. If it is determined that the comparison result of the angle signals DA2 and DB2 is abnormal (S458:NO), that is, if the comparison Y is normal and the comparisons X and Z are abnormal, the process proceeds to S460 and the angle signals DB1 and DB2 are determined as abnormal, and information indicating that the angle signals DB1 and DB2 are abnormal is stored in the angle history information. Then, the process proceeds to S105 of FIG. 7.

In the step S461, to which the process proceeds when a negative determination is made in the step S457, the second control unit 270 determines whether the result of comparison between the angle signals DA2 and DB2 is normal. If it is determined that the comparison result of the angle signals DA2 and DB2 is normal (S461:YES), that is, if the comparison Z is normal and the comparisons X and Y are abnormal, the process proceeds to S462 and the angle signal DA1 is determined as abnormal, and information indicating that the angle signal DA1 is abnormal is stored in the angle history information. Then, the process proceeds to S105 of FIG. 7. If it is determined that the comparison result of the angle signals DA2 and DB2 is abnormal (S461:NO), that is, if the comparisons X, Y and Z are abnormal, the process proceeds to S463 and the angle signals DA1 and DA2 are determined as abnormal, and information indicating that the angle signals DA1 and DA2 are abnormal is stored in the angle history information. Then, the process proceeds to S105 of FIG. 7.

The detection elements include the main detection elements 141 and 241 whose detection values are used for calculation in the control calculation units 172 and 272 when the detection values are normal (i.e., at a normal time), and the sub detection elements 142, 242 whose detection values are used for abnormality monitoring of the main detection elements 141 and 241 when the detection values are normal (i.e., at a normal time). In the abnormality monitoring unit 271, the angle signals DA1 and DA2 related to the main detection elements 141 and 241 are compared with (i) the angle signals DB1 and DB2 related to the sub detection elements in the subject system, and with (ii) the angle signals DA2 and DA1 related to the main detection elements in the other system. The angle signals DB1 and DB2 related to the sub detection elements 142 and 242 are compared with the angle signals DA1 and DA2 of the subject system, but are not compared with the angle signals of the other system. In such manner, the normal signal is appropriately identifiable. Further, by performing abnormality monitoring with priority given to the main signal, the calculation load related to the abnormality monitoring is reducible. Further, the same effects as the above embodiments are achievable by the present embodiment.

Eighth Embodiment

Figures 17, 18:
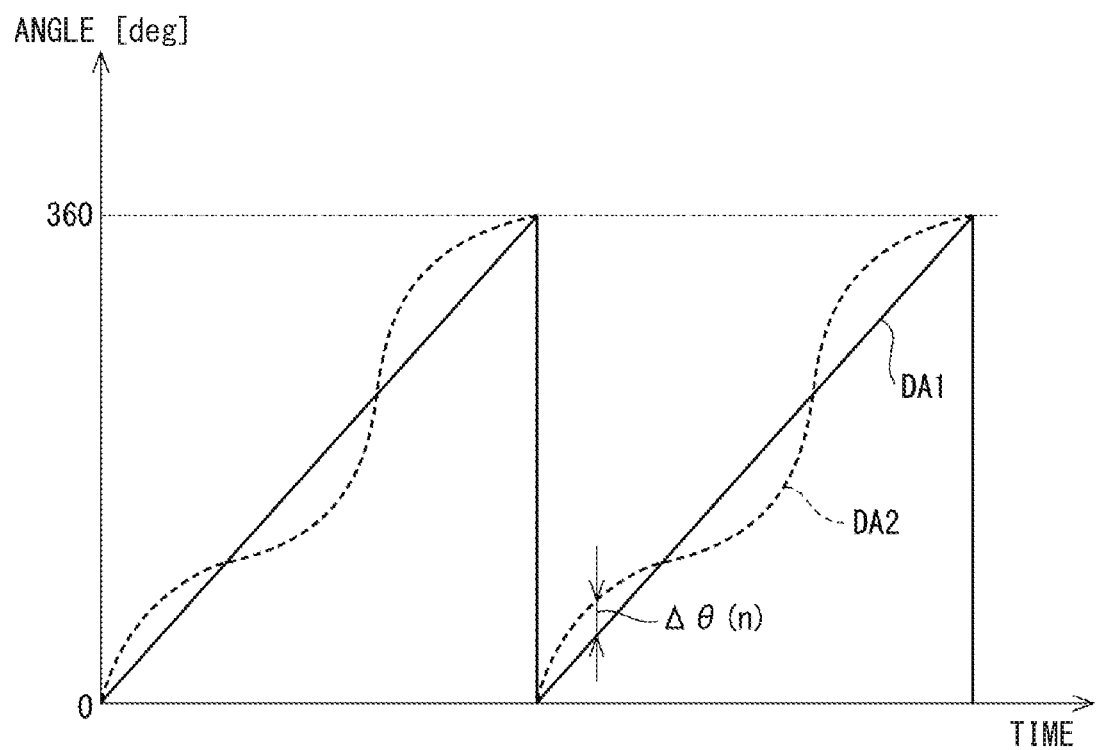
FIG. 17 is a time chart of an inter-system error of the angle signal according to an eighth embodiment.
FIG. 18 is an illustration diagram of a correction map according to the eighth embodiment.
Figure 19:
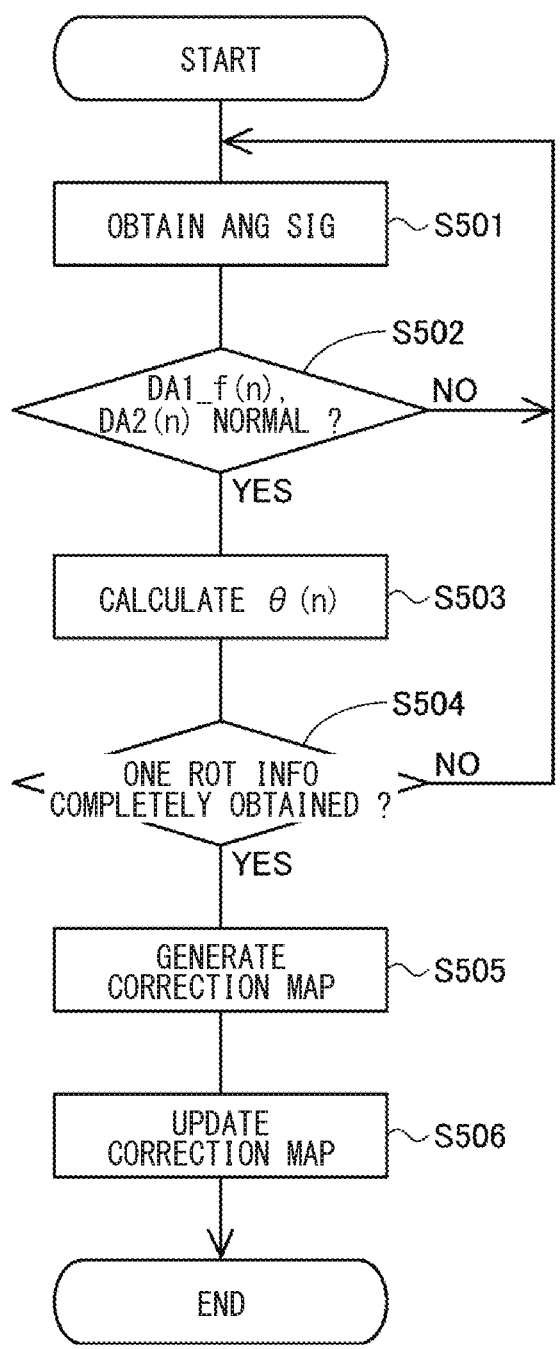
FIG. 19 is a flowchart of a correction value calculation process according to the eighth embodiment.

The eighth embodiment is shown in FIG. 17 to FIG. 19. In the above embodiments, the sensor units 131 and 231 are separately provided for the control units 170 and 270, respectively. Further, the angle signals DA1 and DA2 are used for control, and the angle signals DB1 and DB2 are used for abnormality monitoring. In addition, when the angle signals DA1 and DA2 are normal, the first control unit 170 performs control using the angle signal DA1 and the second control unit 270 performs control using the angle signal DA2.

Since the angle signals DA1 and DA2 are values corresponding to detection values of different detection elements, the angle signals DA1 and DA2 may have errors due to, for example, temperature characteristics of respective sensors, assembly condition of the drive device 40 and the like, as shown in FIG. 17. If an error occurs between the systems, the drive of the motor 80 cannot be properly controlled, and vibration or sound may occur.

Therefore, in the present embodiment, the angle difference between the systems is corrected by using an angle comparison in which signal detection timing is matched between the systems. Hereinafter, correcting the angle difference between the systems as appropriate will be referred to as "inter-system correction." The angle correction may be performed for the signals used for control. Therefore, in the present embodiment, an example of correcting the angle signal DA2 to be adjusted to the angle signal DA1 is described. However, the angle signal DA1 may be adjusted to the angle signal DA2, or the angle signals DA1 and DA2 may both be corrected toward an average of the angle signals DA1 and DA2, or toward a certain calculation value other than the average of the angle signals DA1 and DA2. Further, when the angle signals DB1 and DB2 for abnormality monitoring are used for control, it may be desirable to perform the angle correction of the angle signals DB1 and DB2.

A correction value $\Delta\theta(n)$ is represented by an equation (1), and a corrected angle signal $DA2\_c$ is represented by an equation (2). Here, just like the second embodiment, an example in which the angle estimation value $DA1\_f$ is used will be described. However, a past value held in the subject system may be used, as in the first embodiment.

$$\Delta\theta(n)=DA1\_f(n)-DA2(n) \qquad (1)$$

$$DA2\_c=DA2(n)+\Delta\theta(n) \qquad (2)$$

Here, the correction value $\Delta\theta$ may have an offset deviation and a periodic fluctuation. Therefore, in the present embodiment, data of the angle signals DA1 and DA2 corresponding to a plurality of locations during one rotation of the rotor 860 and the correction value $\Delta\theta$ are obtained, and correction value data for one rotation of the rotor 860 is generated. As shown in FIG. 18, a map is generated in which the angle signal DA2 and the correction value $\Delta\theta$ are associated so that one rotation (i.e., 360 [deg]) of the rotor 860 is equally spaced. For example, if the number of storage areas is 256, the interval of a mechanical angle $\theta m$ is $360/256 \cong 1.41$. In a storage area 0, an angle signal DA2_mr0, which is the angle signal DA2 when the mechanical angle $\theta m=0$, and the correction value $\Delta\theta\_mr0$ are stored in association with each other, and, in a storage area 1, an angle signal DA2_mr1 and the correction value $\Delta\theta\_mr1$ are stored in association with each other, and so on. The suffix "_mrq" means that the value corresponds to each storage area, in which character "q" varies from 0 to 255.

Also, instead of the correction map shown in FIG. 18, the data may be provided as a correction function derived by Fast Fourier Transformation (FFT) or the like (see an equation (3)). In the equation (3), although the angle signal DA2 is described as $\theta$ and the terms are described up to the third order component, the terms may be added up to a necessary order component.

$$\Delta\theta=\alpha\sin(\theta+x)+\beta\sin(2\;\theta+y)+\gamma\sin(3\;\theta+z) \qquad (3)$$

Note that the values used to generate the correction data may be not obtained as a constant depending on the rotation speed of the motor 80, which is thus compensated as appropriate. Also, in order to collect the required number of data, values may be accumulated over multiple rotations of the rotor 860.

A correction value calculation process of the present embodiment is described based on the flowchart of FIG. 19. This process is performed, for example, at the time of product shipment. By performing this process at the time of product shipment, correction of the angle signal is appropriately performable. Further, an increase of the calculation load during control is preventable. Further, for example, this process may be periodically performed at a predetermined cycle during the drive control of the motor 80. In such manner, correction for the temperature characteristics and deterioration by aging is performable, which may make the angle signal correction more appropriate one.

In S501, the second control unit 270 obtains angle signals of the subject system and of the other system. Here, the angle signals $DA2(n)$ and $DB2(n)$, which are current values of the subject system, and the angle estimation values $DA1\_f(n)$ and $DB1\_f(n)$ of the other system are obtained. Hereinafter, the angle estimation value $DA1\_f$ of the other system may simply be referred to as the angle signal DA1.

In S502, the second control unit 270 determines whether or not the angle signal $DA2(n)$ and the angle estimation value $DA1\_f(n)$ are normal. If it is determined that the angle signal $DA2(n)$ and the angle estimation value $DA1\_f(n)$ are not normal (S502:NO), the process returns to S501. If it is determined that the angle signal $DA2(n)$ and the angle estimation value $DA1\_f(n)$ are normal (S502:YES), the process proceeds to S503.

In S503, the second control unit 270 calculates a correction value $\Delta\theta(n)$ by using the angle signal $DA2(n)$ and the angle estimation value $DA1\_f(n)$ (see the equation (1)). In S504, the second control unit 270 determines whether one-rotation information is completely obtained. Here, it may be determined whether information related to the correction value $\Delta\theta$ that can generate a correction data map or a mathematical equation (for example, the equation (3)) shown in FIG. 19 has been accumulated, which may be determinable based on a lapse time from a start of the process and the number of rotations and the rotation speed of the motor 80, or may also be determinable based on the number of accumulated data. If it is determined that the one-rotation information has not yet been completely obtained (S504:NO), the process returns to S501. If it is determined that the one-rotation information is completely obtained (S504:YES), the process proceeds to S505, a correction map is generated, and the correction map is updated in S506. In S505 and S506, instead of using the correction map, a correction function may be generated and updated.

As the angle signal DA2 of the subject system or the angle signal DA1 of the other system, which is used for the calculation of the correction value $\Delta\theta$, i.e., an inter-system error correction value for correcting detection errors between the systems regarding the angle signals DA1 and DA2, the communication delay corrected value is used. In the present embodiment, the angle estimation value $DA1\_f$ is used as the other system calculation value. Further, a past value may be used as the subject system calculation value. In such manner, by using the angle signal in consideration of the communication delay, the correction value $\Delta\theta$ is appropriately calculable.

In the present embodiment, the physical quantity is a rotating magnetic field that periodically changes according to the rotation of the magnet 875. The second control unit 270 generates a correction map or a correction function corresponding to a period of change of the physical quantity based on a plurality of correction values $\Delta\theta$, and performs a correction calculation by using the correction value $\Delta\theta$ according to the period of change of the physical quantity. More specifically, the correction map or the correction function can calculate the correction value $\Delta\theta$ according to the mechanical angle em during one rotation of the motor 80, and correction is performable by using the correction value $\Delta\theta$ according to the mechanical angle em. In such manner, the error between the systems is appropriately reducible. In particular, in a case where the detection element detects the rotation angle of the motor 80 and the drive of the motor 80 is controlled based on the detection value of the detection element, the drive of the motor 80 is appropriately controllable by appropriately correcting the inter-system error, thereby vibration and/or noise sound is reducible.

Ninth Embodiment

Figure 20:
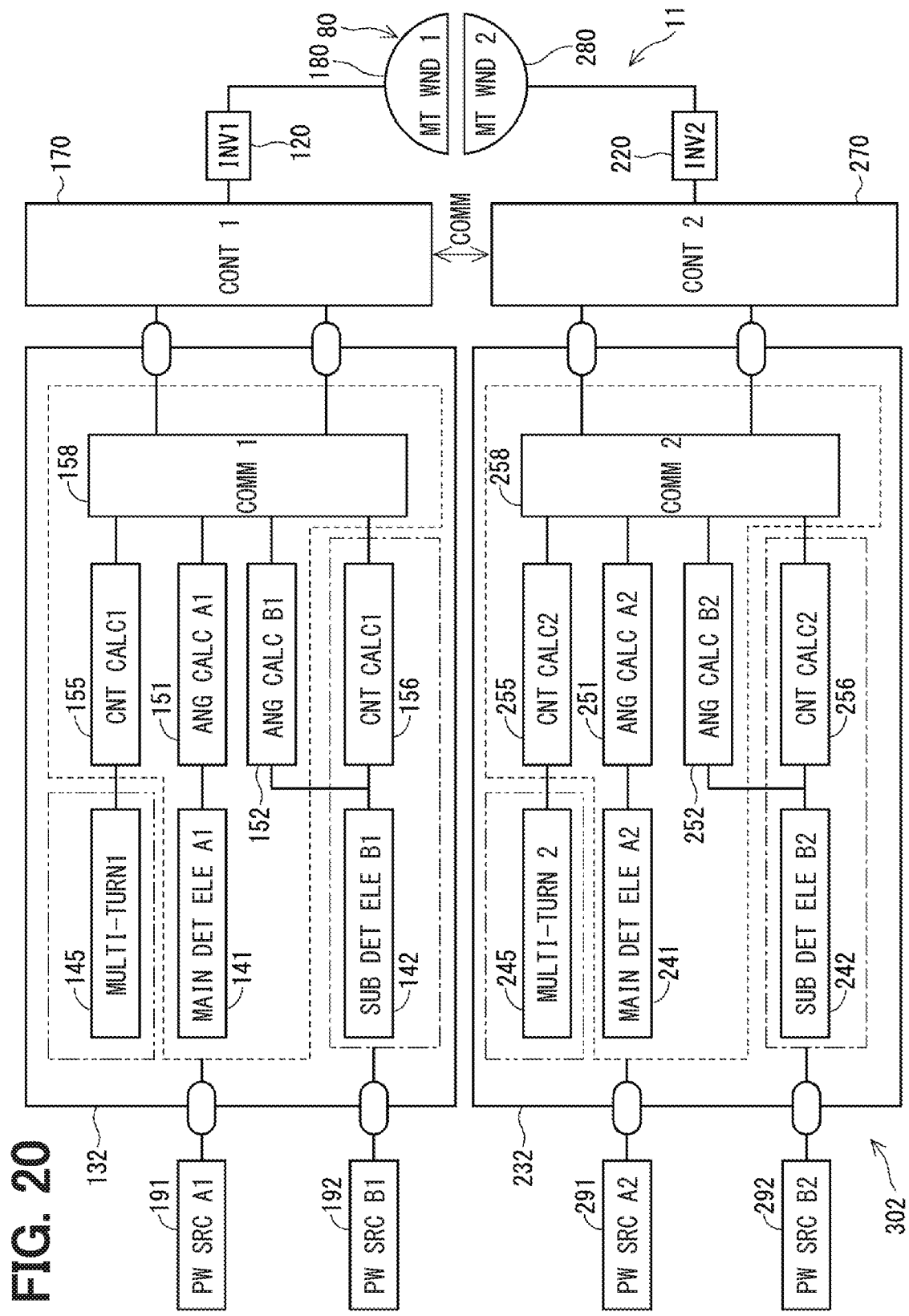
FIG. 20 is a block diagram of the ECU according to a ninth embodiment.

The ninth embodiment is shown in FIG. 20. An ECU 11 of the present embodiment includes the drive circuits 120 and 220, the control units 170 and 270, a rotation angle sensor 302, and the like. The rotation angle sensor 302 includes a first sensor unit 132 and a second sensor unit 232. The first sensor unit 132 includes the main detection element 141, the sub detection element 142, a multi-turn detection unit 145, the angle calculation units 151 and 152, count calculation units 155 and 156, and the communication unit 158. The second sensor unit 232 includes the main detection element 241, the sub detection element 242, a multi-turn detection unit 245, the angle calculation units 251 and 252, count calculation units 255 and 256, and the communication unit 258.

The multi-turn detection units 145 and 245 are configured to be capable of capturing a change in magnetic flux accompanying the rotation of the magnet 875 even without power supply. In other words, the multi-turn detection units 145, 245 use a storage method other than using electricity (i.e., magnetic storage method in the present embodiment). More specifically, in the multi-turn detection units 145 and 245, the magnetic detection elements are arranged in, for example, a spiral or helical shape, and the elements initially face a specific magnetic direction. When the magnet 875 rotates, the magnetic detection element detects changes of the magnetic direction sequentially from one end of the spiral or helical shape, and, every time the rotor 860 rotates and makes one complete turn, a position where the direction of magnetic flux changes outward or inward changes according to a rotation direction of the rotor 860. The magnetic detection element changes its resistance value according to the magnetic direction. Electric power is not required for the change of the magnetic direction of the magnetic detection element. Further, the rotation position of the rotor 860 is measurable by supplying an electric current to the helical shape magnetic detection element and by detecting the output therefrom. That is, the multi-turn detection units 145, 245 do not need electric power when detecting a rotation, and need electric power when reading the detection value. In FIG. 20, blocks encircled by broken lines receive supply of electric power when an ignition switch (IG) is turned ON, blocks encircled by one-dot chain lines are always receive supply of electric power, and blocks encircled by two-dot chain lines do not need supply of electric power.

A count calculation unit 155 calculates a count value NPTC1 according to an output of the multi-turn detection unit 145 when the multi-turn detection unit 145 is energized (i.e., receives electric power). A count calculation unit 255 calculates a count value NPTC2 according to an output of the multi-turn detection unit 245 when the multi-turn detection unit 245 is energized.

The sub detection elements 142 and 242 and count calculation units 156 and 256 always receive a supply of electric power. More specifically, the sub detection element 142 and the count calculation unit 156 always receive a supply of electric power from a battery or the like via a power source 192 which is a regulator or the like, without having the IG interposed in the path from the power source 192. Further, the sub detection element 242 and the count calculation unit 256 always receive supply of electric power from a battery or the like via a power source 292 which is a regulator or the like, without having the IG interposed in the path from the power source 292.

The count calculation unit 156 calculates a count value LPTC1 according to the detection value of the sub detection element 142, and the count calculation unit 256 calculates a count value LPTC2 according to the detection value of the sub detection element 242.

The count values NPTC1, NPTC2, LPTC1, and LPTC2 are counted up or down n times (i.e., n is an integer of 1 or more) during one rotation of the rotor 860 according to the rotation direction of the rotor 860. When n is set to 3 or more, the rotation direction is detectable. In the present embodiment, n=4, which makes those count values counted up/down every time the rotor 860 rotates 90 [deg]. The count values NPTC and LPTC are calculated using detection values of different detection methods, which may be designated as a hetero-redundant configuration. Note that the number of counts may be different among the count value NPTC and the count value LPTC, e.g., the count value NPTC is counted up/down by one count in one rotation of the rotor 860 while the count value LPTC is counted up/down by four counts in one rotation of the rotor 860. For comparison purposes, the count value NPTC or LPTC may be converted as required. Hereafter, when the distinction between the detection units is unnecessary, the count value may simply be designated as TC.

By comparing the count values NPTC1 and LPTC1, the presence or absence of abnormality is detectable. The comparison of the count values may be performed in the sensor unit 132 or may be performed by the control unit 170. Further, the presence of abnormality is detectable by comparing the count values NPTC2 and LPTC2. The comparison of the count value may be performed in the sensor unit 232 or may be performed by the control unit 270.

The communication unit 158 generates an output signal including the angle signals DA1, DB1 and the count values NPTC1, LPTC1, and outputs the output signal to the first control unit 170. The communication unit 258 generates an output signal including the angle signals DA2, DB2 and the count values NPTC2, LPTC2, and outputs the output signal to the second control unit 270.

Although the multi-turn detection units 145 and 245 have the merit of not requiring power supply, there is a possibility of failure risks of rotation number difference among them, data loss due to external magnetic fields and/or long-term data retention. Therefore, in the present embodiment, in addition to the calculation of the count values NPTC1 and NPTC2 using the detection values of the multi-turn detection units 145 and 245, electric power is continuously supplied to the sub detection elements 142 and 242 and to the count calculation units 156 and 256 for the calculation of the count value LPTC1 and LPTC2. In such manner, calculation of the count value is made redundant, and abnormality of the device is detectable. Further, by providing the multi-turn detection units 145 and 245 and the sub detection elements 142 and 242 with respectively different configurations from each other, a common cause failure hardly occurs among them, and abnormality is easily detectable.

In the preceding embodiments, abnormality monitoring is performed by comparing the angle signals DA1, DB1, DA2, and DB2 in consideration of difference of the detection timings. In the present embodiment, instead of using the angle signals DA1 and DA2 of the first system L1, the following four absolute angles θa11, θa12, θa13, and θa14 are usable. The absolute angle is a rotation angle from a reference position, and includes multi-turn information.

The absolute angle θa11 is calculated by using a current value of the count value NPTC1 and a current value of the angle signal DA1. Assuming that the current value of the count value NPTC1 is NPTC1($n$), and a mechanical angle corresponding to the angle signal DA1 is θm_A1($n$), the absolute angle θa11 is represented by an equation (4-1). A term INT(TC/d) in the equation is an integral part of a quotient obtained by dividing the count value TC by the count number d per one rotation of the rotor 860, which means the number of rotations of the rotor 860.

$$\theta a11 = \text{INT}(NPTC1(n)/d) + \theta m\_A1(n) \qquad (4-1)$$

The absolute angle θa12 is calculated by using an initial value of the count value NPTC1, an initial value of the angle signal DA1, and an amount of change of the angle signal DA1. Assuming that the initial value of the count value NPTC1 is NPTC1(0) and the initial value of the mechanical angle corresponding to the angle signal DA1 is θm_A1(0), the absolute angle θa12 is represented by an equation (4-2). Here, the initial value is an initial value after the IG is switched from OFF to ON.

$$\theta a12 = \qquad (4-2)$$
$$INT(NPTC1(0)/d) + \theta m\_A1(0) + \sum_{k=1}^{n} \{\theta m\_A1(k) - \theta m\_A1(k-1)\}$$

The absolute angle θa13 is calculated using a current value of the count value LPTC1 and a current value of the angle signal DB1. Assuming that the current value of the count value LPTC1 is LPTC1($n$) and the mechanical angle corresponding to the angle signal DB1 is θm_B1($n$), the absolute angle θa13 is represented by an equation (4-3).

$$\theta a13 = \text{INT}(LPTC1(n)/d) + \theta m\_B1(n) \qquad (4-3)$$

The absolute angle θa14 is calculated using an initial value of the count value LPTC1, an initial value of the angle signal DB1, and an amount of change of the angle signal DB1. Assuming that the initial value of the count value LPTC1 is LPTC1(0) and the initial value of the mechanical angle corresponding to the angle signal DB1 is θm_B1(0), the absolute angle θa14 is represented by an equation (4-4).

$$\theta a14 = \qquad (4-4)$$
$$INT(LPTC1(0)/d) + \theta m\_B1(0) + \sum_{k=1}^{n} \{\theta m\_B1(k) - \theta m\_B1(k-1)\}$$

Any two of the absolute angles θa11, θa12, θa13, and θa14 may be used as values related to the first system L1. Further, any two of absolute angles θa21, θa22, θa23, and θa24 may be used as values related to the second system L2. The calculation of the absolute angles θa21, θa22, θa23, and θa24 is performable by replacing the suffix "1" representing the system in the equations (4-1) to (4-4) with "2," and thus the description thereof is omitted.

Regarding the above, for preventing abnormality in both of two information pieces from the same element, it may be preferable (i) to use the absolute angle θa11 or absolute angle θa12 instead of using the angle signal DA1 and (ii) to use the absolute angle θa13 or absolute angle θa14 instead of using the angle signal DB1. The same applied to the second system L2.

In the present embodiment, similar to the description in the preceding embodiments, by comparing the absolute angles θa21 and θa23 with angle estimation values θa11_$f$ and θa13_$f$ estimated in consideration of the communication delay (i.e., with the values estimated as having the matching detection timing), for example, the second control unit 270 can appropriately perform abnormality monitoring even by using the absolute angles. Further, similar to the description in the preceding embodiments, by calculating the inter-system error correction value Δθa by using the absolute angle θa21 and the angle estimation value θa11_$f$, the inter-system detection error between the systems is appropriately reducible even by using the absolute angles in the present embodiment. Further, as shown in the first embodiment, a past value may be used as the value of the subject system. Further, the same effects as the above embodiments are achievable by the present embodiment.

In the present embodiment, the absolute angles including the multi-turn information are used as the subject system calculation value and the other system calculation value. The absolute angle may be calculated in the sensor unit or may be calculated by the control unit. When calculating the absolute angle in the sensor unit, the absolute angle corresponds to the "subject system calculation value" or the "other system calculation value" and to the "physical quantity calculation value." When the sensor unit outputs the count value and the angle signal to the control unit and the control unit calculates the absolute angle, the count value and the angle signal correspond to the "physical quantity calculation value," and the absolute angle corresponds to the "subject system calculation value" or the "other system calculated value."

Tenth Embodiment

Figure 21:
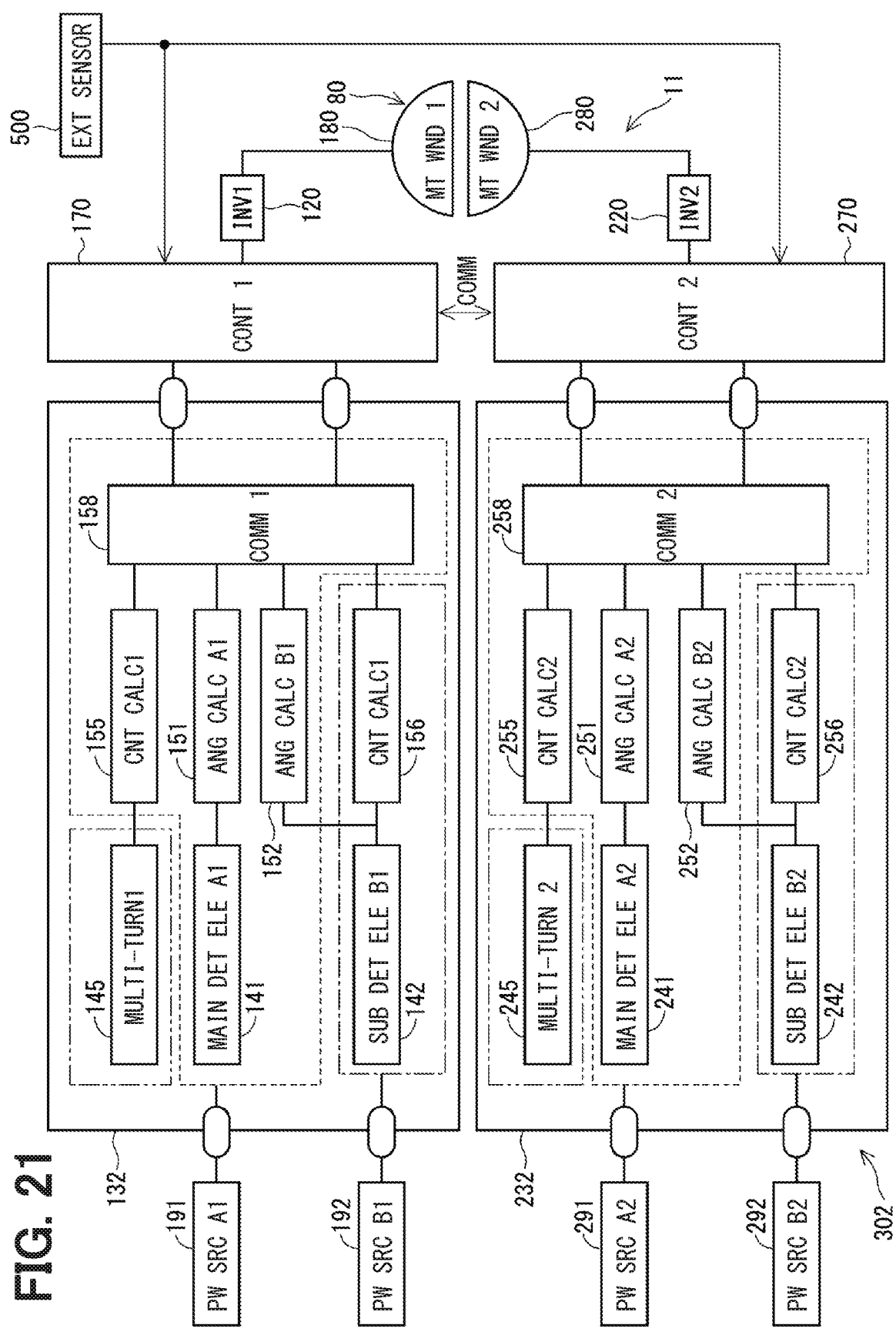
FIG. 21 is a block diagram of the ECU according to a tenth embodiment.

The tenth embodiment is shown in FIG. 21. In the present embodiment, the control units 170 and 270 are capable of obtaining, from an external sensor 500, the detection values that can be converted to the absolute angle θa. Communication between the external sensor 500 and the control units 170 and 270 may be any communication method such as CAN (Controller Area Network), LIN (Local Interconnect Network), Flexray, or the like. The external sensor 500 is, for example, a steering sensor, a torque sensor with a built-in steering sensor, a stroke sensor, a torque sensor with a built-in stroke sensor, or the like. A value obtained by converting, using a gear ratio of a gear or the like connecting the motor 80 and the steering system, the detection value of the external sensor 500 to be comparable with absolute angles θa_A and θa_B is set as an absolute angle θa_C. Although one external sensor 500 is illustrated in FIG. 21, absolute angles may be obtained from a plurality of external sensors.

In addition to the absolute angle described in the eighth embodiment, the absolute angle θa_C derived from the external sensor 500 is used for performing the same abnormality monitoring and error correction as in the above embodiments. In such case, as a value from the external sensor 500, an estimation value estimated in consideration of the communication delay may be used. Also, a past value having a matching detection timing may be used.

From the external sensor 500, at least one control unit among the control units 170, 270 obtains an external detection value based on a physical quantity different from the absolute angle of the subject system, which is comparable with the absolute angle of the subject system. When the absolute angle of the subject system and the external detection value are compared, the communication delay corrected value is used as the absolute angle of the subject system or as the external detection value. In such manner, abnormality monitoring or error correction using the detection value of the external sensor 500 is appropriately performable. Further, if the number of values used for comparison is three or more, abnormality may be determinable by majority decision.

Furthermore, by using the detection value of the external sensor 500, abnormality of the absolute angle, which may be caused by a play of a gear, a belt or the like connecting the electric power steering apparatus 8 and the steering system, is appropriately detectable. Further, even when the inter-computer communication is interrupted, if communication with the external sensor 500 is performable, abnormality detection and inter-system correction using the absolute angle θa_C are continuable.

In the present embodiment, since all of the detection elements related to the calculation of the mechanical angle and the detection elements related to the calculation of the number of rotations are redundant in the system (i.e., within each of the two systems of motor control), the drive control by the two systems is continuable even when abnormality is detected in some part of the two systems.

Further, by using the external sensor 500 for abnormality monitoring and inter-system correction, abnormality monitoring and inter-system error correction are accurately performable. Further, the same effects as the above embodiments are achievable by the present embodiment.

In the above embodiments, the ECUs 10 and 11 correspond to "detection units," the main detection elements 141 and 241, the sub detection elements 142 and 242, and the multi-turn detection units 145 and 245 correspond to "detection elements," and the angle calculation unit 151, 152, 251, 252, and the count calculation units 155, 156, 255, 256 correspond to "calculation units." Further, "physical quantity" is a measurement of a magnetic field generated by the magnet 875.

In the example of the first embodiment and the like, the angle signal corresponds to a "physical quantity calculation value," and, in the first control unit 170, the angle signals DA1 and DB1 correspond to a "subject system calculation value" and the angle signals DA2 and DB2 correspond to an "other system calculation value," and in the second control unit 270, the angle signals DA2 and DB2 correspond to a "subject system calculation value," and the angle signals DA1 and DB1 correspond to an "other system calculation value." Further, in the first embodiment, the past value such as the previous value corresponds to a "communication delay corrected value," and, in the second embodiment and the like, the angle θstimation value is the "predicted value" and corresponds to a "communication delay corrected value." Further, the correction value Δθ corresponds to an "inter-system error correction value."

Other Embodiments

In the above embodiments, the detection unit is used in an electric power steering apparatus. In the other embodiment, the detection unit may also be applicable to a steering sensor. Further, it is suitably applicable to an application which requires a rotation number and a rotation angle. Further, if a stroke position is converted to a rotation system coordinate by using a gear, the detection unit may also applicable to a stroke sensor.

In the above embodiments, the sensor unit is a rotation angle sensor that detects a rotation of a motor. In the other embodiment, the sensor unit is applicable not only to the rotation angle sensor but also to a sensor that measures a physical quantity, such as a current sensor, a torque sensor, a pressure sensor, a temperature sensor, a distance sensor such as a laser displacement meter and the like.

In the tenth embodiment, as an example of the external sensor, variations like a steering sensor, a torque sensor with a built-in steering sensor, a stroke sensor, and a torque sensor with a built-in stroke sensor are shown. In the other embodiment, a laser displacement meter or an analysis value of an image captured by a camera may also be used as the external sensor.

In the above embodiments, communication between the control units is performed as the inter-computer communication. In the other embodiment, communication between the control units may be performed via a vehicle communication network such as CAN instead of using the inter-computer communication.

In the above embodiments, two or four detection elements are provided in one sensor unit. In the other embodiment, the number of detection elements in one sensor unit may be one, three, five or more. In the above embodiments, two control units and two sensor units are provided, and the number of systems is two. In the other embodiment, three or more control units and sensor units may be provided, and the number of systems may be three or more. In the above embodiments, electric power is supplied from a separate power source for each system. In the other embodiment, each system may be configured to receive a supply of electric power from a common, i.e., one, power source.

In the ninth and tenth embodiments, a power-free multi-turn detection unit is provided in each system. In the other embodiment, the multi-turn detection unit may be omitted from one system or from all systems. In such manner, configuration may be simplified. Further, a plurality of multi-turn detection units may be provided for each system. In such manner, even if abnormality occurs in some of the multi-turn detection units, calculation of the count value is continuable in each system. Further, when the multi-turn detection unit is provided, it is not necessary to perform calculation of the count value based on the sub detection element. In such manner, configuration is simplified, and a continuous power supply to the sensor unit becomes unnecessary.

In the above embodiments, the motor is a three-phase brushless motor. In the other embodiment, the motor is not limited to a three-phase brushless motor, but may be any type of motor. Further, the motor is not limited to a motor (i.e., an electric motor), but may be a generator, or may be a so-called motor-generator having both of the motor function and the generator function. In the above embodiments, the inverter and motor windings are provided in two systems. In the other embodiment, the number of inverters and motor windings may be one or three or more. Also, the number of inverters and motor windings may be different from each other. In the above embodiments, the drive device including the detection unit is applied to the electric power steering apparatus. In the other embodiment, the drive device may be applied to other apparatuses different from the electric power steering apparatus.

The control unit and the method thereof described in the present disclosure may be realized by a dedicated computer including a processor and a memory programmed to execute one or more functions embodied by a computer program. Alternatively, the control unit and the method thereof described in the present disclosure may be realized by a dedicated computer including a processor with one or more dedicated hardware logic circuits. Alternatively, the control unit and the method thereof described in the present disclosure may be realized by one or more dedicated computers configured as a combination of (i) a processor and a memory programmed to execute one or more functions and (ii) a processor with one or more hardware logic circuits. Further, the computer program may be stored, as instructions performable by a computer, in a tangible, non-transitory computer-readable medium. The present disclosure is not limited to the above embodiments, but various modifications may be implementable without departing from the spirit of the present disclosure.

What is claimed is:

1. A detection unit comprising:
   a plurality of sensor units each having a detection element configured to detect a change in a physical quantity and a calculation unit configured to calculate a physical quantity calculation value according to the physical quantity detected by the detection element; and
   a plurality of control units each (i) having an abnormality monitoring unit configured to monitor abnormality of the physical quantity calculation value and a control calculation unit configured to perform a calculation by using the physical quantity calculation value, and (ii) obtain the physical quantity calculation value from respectively different sensor units, wherein
   one control unit of the plurality of control units and one sensor unit of the plurality of sensor units from which the one control unit obtains the physical quantity calculation value is defined as a system,
   at least one control unit obtains the physical quantity calculation value of an other system or an other system calculation value that is calculated based on the physical quantity calculation value of the other system from a control unit of the other system by communication,
   when the abnormality monitoring unit of a subject system compares the physical quantity calculation value of the subject system or a subject system calculation value that is calculated based on the physical quantity calculation value of the subject system with the other system calculation value, the abnormality monitoring unit of the subject system uses a communication delay corrected value having a correction of communication delay as the subject system calculation value or as the other system calculation value,
   wherein the physical quantity is associated with an angle sensor,
   wherein the physical quantity calculation value is an angle, and
   wherein monitoring abnormality of the physical quantity calculation value includes determining whether the physical quantity calculation value is normal by comparing a difference between the physical quantity calculation value and a reference value with an abnormality determination threshold, the physical quantity calculation value being determined as normal when the difference is equal to or less than the abnormality determination threshold.

2. The detection unit of claim 1, wherein
   the communication delay corrected value is a past value of the subject system calculation value detected at an earlier timing by a time amount of the communication delay than a timing at which the other system calculation value is obtained.

3. The detection unit of claim 1, wherein
   the communication delay corrected value is a predicted value of the other system calculation value having a predicted amount of correction corresponding to a time amount of the communication delay.

4. The detection unit of claim 1, wherein
   at least one detection element has a different configuration related to the element.

5. The detection unit of claim 1, wherein
   the detection element includes (i) a main detection element, the physical quantity calculation value of which is configured to control calculation in the control calculation unit at a normal time, and (ii) a sub detection element configured for abnormality monitoring of the main detection element at the normal time, and
   the abnormality monitoring unit
   compares (A) the subject system calculation value related to the main detection element with (B) the subject system calculation value of the sub detection element and with the other system calculation value related to the main detection element of the other system, and
   compares (C) the subject system calculation value related to the sub detection element with (D) the subject system calculation value related to the main detection element, but not with (E) the other system calculation value related to the sub detection element of the other system.

6. The detection unit of claim 1, wherein the abnormality monitoring unit calculates a reference signal by using at least two subject system calculation values and other system calculation values, and performs abnormality monitoring by comparison with the reference signal.

7. The detection unit of claim 1, wherein
   the abnormality monitoring unit performs abnormality monitoring by performing a comparison of two values of the physical quantity calculation value with at least one subject-to-comparison pair of the two values set in advance, for a state in which a comparison result of the subject-to-comparison pair is normal, the values of the subject-to-comparison pair are identified as normal, and for a state in which the comparison result of the subject-to-comparison pair is abnormal, a new pair having a normal comparison result is searched for, and for a state in which there are new pairs having a normal comparison result, the values of the new pairs having a normal comparison result are identified as normal, with at least one normal pair newly set as a subject-to- comparison pair for a next and subsequent comparisons.

8. The detection unit of claim 1, wherein the abnormality monitoring unit performs abnormality monitoring by performing a comparison of two values of the physical quantity calculation value with at least one subject-to-comparison pair of the two values set in advance, and performing a retry comparison of the two values when a comparison result is abnormal for a number of retries, and identifying an abnormal value according to the number of retries.

9. The detection unit of claim 1, wherein the subject system calculation value or the other system calculation value used in a calculation of an inter-system error correction value for correcting a detection error of the physical quantity calculation value between the systems is the communication delay corrected value.

10. The detection unit of claim 9, wherein the physical quantity changes periodically, and the at least one control unit generates a correction map or a correction function corresponding to a period of change of the physical quantity based on a plurality of inter-system error correction values, and performs a correction calculation by using the inter-system error correction value according to the period of change of the physical quantity.

11. The detection unit of claim 1, wherein the at least one control unit obtains, from an external sensor, an external detection value based on a physical quantity different from the subject system calculation value, which is comparable with the subject system calculation value, and when the subject system calculation value and the other system calculation value are compared with the external detection value, the communication delay corrected value is used as at least one of the subject system calculation value, the other system calculation value and the external detection value.

* * * * *